United States Patent
Wang

(10) Patent No.: US 9,521,570 B2
(45) Date of Patent: Dec. 13, 2016

(54) COMMUNICATION CONTROL METHOD, USER EQUIPMENT, NETWORK SERVER, AND SYSTEM

(71) Applicant: Huawei Device Co., Ltd., Shenzhen (CN)

(72) Inventor: Jian Wang, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 113 days.

(21) Appl. No.: 14/586,166

(22) Filed: Dec. 30, 2014

(65) Prior Publication Data

US 2015/0117247 A1 Apr. 30, 2015

Related U.S. Application Data

(63) Continuation of application No. PCT/CN2013/074987, filed on Apr. 28, 2013.

(51) Int. Cl.
*H04W 24/08* (2009.01)
*H04W 76/00* (2009.01)
(Continued)

(52) U.S. Cl.
CPC ............ *H04W 24/08* (2013.01); *H04W 8/005* (2013.01); *H04W 76/00* (2013.01); *H04W 76/023* (2013.01); *H04W 92/18* (2013.01)

(58) Field of Classification Search
CPC .... H04W 24/08; H04W 28/02; H04W 28/044; H04W 8/005; H04W 76/00; H04W 92/18; H04W 76/02; H04W 76/023; H04W 4/005; H04W 28/0215
See application file for complete search history.

(56) References Cited

U.S. PATENT DOCUMENTS

2006/0168343 A1 7/2006 Ma et al.
2011/0151887 A1 6/2011 Hakola et al.
(Continued)

FOREIGN PATENT DOCUMENTS

CN 1527623 A 9/2004
CN 102404837 A 4/2012
(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 11)," 3GPP TS 36.211, V11.2.0, Technical Specification, Feb. 2013, 109 pages.
(Continued)

*Primary Examiner* — Paul H Masur
*Assistant Examiner* — Kabir Jahangir
(74) *Attorney, Agent, or Firm* — Conley Rose, P.C.

(57) ABSTRACT

A communication control method, including receiving, by a first user equipment, a first message sent by a second user equipment; acquiring receive power of the first message; acquiring power parameter information of the second user equipment; obtaining a path loss value according to the power parameter information of the second user equipment and the receive power of the first message; and determining, according to the path loss value, whether direct communication is allowed between the first user equipment and the second user equipment. The embodiments of the present invention further provide a corresponding user equipment and system. According to the method, user equipment, and system in the embodiments of the present invention, control on direct communication between user equipment can be implemented.

18 Claims, 13 Drawing Sheets

(51) Int. Cl.
*H04W 8/00* (2009.01)
*H04W 76/02* (2009.01)
*H04W 92/18* (2009.01)

(56) References Cited

U.S. PATENT DOCUMENTS

| | | | |
|---|---|---|---|
| 2011/0205887 | A1 | 8/2011 | Wu et al. |
| 2011/0282989 | A1 | 11/2011 | Geirhofer et al. |
| 2012/0115518 | A1* | 5/2012 | Zeira ............. H04W 76/023 455/500 |
| 2014/0057670 | A1* | 2/2014 | Lim ............... H04W 8/005 455/509 |
| 2014/0120934 | A1 | 5/2014 | Kishiyama |
| 2014/0153390 | A1* | 6/2014 | Ishii ............... H04W 76/023 370/230 |

FOREIGN PATENT DOCUMENTS

| | | |
|---|---|---|
| CN | 102668686 A | 9/2012 |
| CN | 102893657 A | 1/2013 |
| JP | 2012016036 A | 1/2012 |
| JP | 2012507975 A | 3/2012 |
| JP | 2013521678 A | 6/2013 |
| WO | 2007082036 A1 | 7/2007 |
| WO | 2010053688 A1 | 5/2010 |
| WO | 2012096968 A1 | 7/2012 |
| WO | 2013002206 A1 | 1/2013 |

OTHER PUBLICATIONS

"3rd Generation Partnership Project; Technical Specification Group Radio Access Network; Evolved Universal Terrestrial Radio Access (E-UTRA); Multiplexing and channel coding (Release 11)," 3GPP TS 36.212, V11.2.0, Technical Specification, Feb. 2013, 82 pages.
"3rd Generation Partnership Project; Technical Specification Group Radio Access Network; Evolved Universal Terrestrial Radio Access (E-UTRA); Physical layer procedures (Release 11)," 3GPP TS 36.213, V11.2.0, Technical Specification, Feb. 2013, 173 pages.
Foreign Communication From a Counterpart Application, PCT Application No. PCT/CN2013/074987, International Search Report dated Feb. 6, 2014, 7 pages.
Foreign Communication From a Counterpart Application, PCT Application No. PCT/CN2013/074987, Written Opinion dated Feb. 6, 2014, 6 pages.
Partial English Translation and Abstract of Chinese Patent Application No. CN102404837A, Sep. 7, 2015, 12 pages.
Foreign Communication From a Counterpart Application, European Application No. 13883371.0, Extended European Search Report dated Aug. 31, 2015, 7 pages.
Partial English Translation and Abstract of Japanese Patent Application No. JPA201216036, Jul. 28, 2016, 87 pages.
Partial English Translation and Abstract of Japanese Patent Application No. JPA2012507975, Jul. 28, 2016, 47 pages.
Partial English Translation and Abstract of Japanese Patent Application No. JPA2013521678, Jul. 28, 2016, 70 pages.
Foreign Communication From a Counterpart Application, Japanese Application No. 2015-555541, Japanese Office Action dated Jun. 14, 2016, 5 pages.
Foreign Communication From a Counterpart Application, Japanese Application No. 2015-555541, English Translation of Japanese Office Action dated Jun. 14, 2016, 6 pages.

\* cited by examiner

COMMUNICATION CONTROL METHOD, USER EQUIPMENT, NETWORK SERVER, AND SYSTEM

CROSS-REFERENCE TO RELATED APPLICATIONS

This application is a continuation of International Application No. PCT/CN2013/074987, filed on Apr. 28, 2013, which is hereby incorporated by reference in its entirety.

TECHNICAL FIELD

The present invention relates to the field of communications technologies, and in particular, to a communication control method for establishing a communication connection, a user equipment, a network server, and a system.

BACKGROUND

In a traditional commercial mobile communications network, a user of a user equipment needs to perform scheduling and signal transfer using a network server, such as a base station, to establish a connection with a user of another user equipment. During an evolution process of the mobile communications network, for some network environments, such as a public security network and a location-based social network, a design requirement of device to device proximity service (D2D ProSe) is proposed. D2D ProSe supports direct communication between user equipments, that is, communication between user equipments directly occurs between related user equipments, and a third-party node does not participate in data communication between a source and a sink. D2D ProSe can meet a communication requirement of the public security network and the social network.

In D2D ProSe, a communication connection can be directly established between user equipments for communication, not requiring scheduling, transfer, and control of a base station. Therefore, D2D ProSe lacks control on direct communication between the user equipments. If a direct communication service is performed between user equipments not meeting sufficient communication conditions, quality of the direct communication is relatively poor.

SUMMARY

A communication control method, a user equipment, a network server, and a system are provided herein, to resolve a problem that D2D ProSe lacks control on direct communication.

According to a first aspect, a communication control method is provided and includes receiving, by a first user equipment, a first message sent by a second user equipment; acquiring receive power of the first message; acquiring power parameter information of the second user equipment; obtaining a path loss value according to the power parameter information of the second user equipment and the receive power of the first message; and determining, according to the path loss value, whether direct communication is allowed between the first user equipment and the second user equipment.

In a first possible implementation manner of the first aspect, the acquiring power parameter information of the second user equipment includes carrying, by the first message, the power parameter information of the second user equipment; and acquiring the power parameter information of the second user equipment carried in the first message.

In a second possible implementation manner of the first aspect, the acquiring power parameter information of the second user equipment includes receiving a second message, where the second message carries the power parameter information of the second user equipment; and acquiring the power parameter information of the second user equipment carried in the second message.

With reference to the first aspect, or the first or the second possible implementation manner of the first aspect, in a third possible implementation manner, the determining, according to the path loss value, whether direct communication is allowed between the first user equipment and the second user equipment includes, if the path loss value is less than a first threshold, allowing direct communication between the first user equipment and the second user equipment; and if the path loss value is greater than the first threshold, prohibiting direct communication between the first user equipment and the second user equipment.

With reference to the first aspect, or the first or the second or the third possible implementation manner of the first aspect, in a fourth possible implementation manner, the power parameter information of the second user equipment is a transmit power value of the second user equipment; and the obtaining a path loss value according to the power parameter information of the second user equipment and the receive power of the first message includes performing calculation according to the transmit power value of the second user equipment and a receive power value of the first message to obtain the path loss value.

With reference to the first aspect, or the first or the second or the third possible implementation manner of the first aspect, in a fifth possible implementation manner, the power parameter information of the second user equipment is a transmit power range or a power class of the second user equipment; and the obtaining a path loss value according to the power parameter information of the second user equipment and the receive power of the first message includes determining a maximum transmit power value of the second user equipment according to the transmit power range or the power class of the second user equipment; and performing calculation according to the maximum transmit power value of the second user equipment and a receive power value of the first message to obtain the path loss value.

With reference to the first aspect, or the first or the second or the third or the fourth or the fifth possible implementation manner of the first aspect, in a sixth possible implementation manner, before the determining, according to the path loss value, whether direct communication is allowed between the first user equipment and the second user equipment, the method further includes receiving the first threshold sent by a network server, where the network server includes an evolved NodeB (eNodeB), a base transceiver station (BTS), a serving gateway (SGW), a packet gateway (PGW), a radio network controller (RNC), or a core network element; or receiving the first threshold sent by a third user equipment, where the third user equipment includes a cluster head Cluster head or a Wireless Fidelity (Wi-Fi) hotspot device.

With reference to the first aspect, or the first or the second or the third or the fourth or the fifth possible implementation manner of the first aspect, in a seventh possible implementation manner, the first threshold is pre-stored in the first user equipment.

With reference to the first aspect, or the first or the second or the third or the fourth or the fifth or the sixth or the seventh possible implementation manner of the first aspect, in an eighth possible implementation manner, the first message includes a discovery message, a paging message, a paging response message, a service message, or a test message.

With reference to the first aspect, or the first or the second or the third or the fourth or the fifth or the sixth or the seventh or the eighth possible implementation manner of the first aspect, in a ninth possible implementation manner, the power parameter information is indicated by a time resource, a frequency resource, or a code word resource for transmitting the first message or the second message.

According to a second aspect, another communication control method is provided and includes sending, by a second user equipment, a first message to a first user equipment, where the first message carries power parameter information of the second user equipment, and the power parameter information is used to obtain a path loss value according to receive power of the first message and the power parameter information of the second user equipment, and determine, according to the path loss value, whether direct communication is allowed between the first user equipment and the second user equipment.

In a first possible implementation manner of the second aspect, the first message includes a discovery message, a paging message, a paging response message, a service message, or a test message.

According to a third aspect, a user equipment is provided, where the user equipment performs communication with a second user equipment, and the user equipment includes a first receiving unit configured to receive a first message sent by the second user equipment; a first acquiring unit configured to acquire receive power of the first message; a second acquiring unit configured to acquire power parameter information of the second user equipment; a third acquiring unit configured to obtain a path loss value according to the power parameter information of the second user equipment and the receive power of the first message; and a first determining unit configured to determine, according to the path loss value, whether direct communication is allowed between the first user equipment and the second user equipment.

In a first possible implementation manner of the third aspect, the first message carries the power parameter information of the second user equipment; and the second acquiring unit is configured to acquire the power parameter information of the second user equipment carried in the first message.

In a second possible implementation manner of the third aspect, the user equipment further includes a second receiving unit configured to receive a second message, where the second message carries the power parameter information of the second user equipment; and the second acquiring unit is configured to acquire the power parameter information of the second user equipment carried in the second message.

With reference to the third aspect, or the first or the second possible implementation manner of the third aspect, in a third possible implementation manner, the first determining unit is configured to, if the path loss value is less than a first threshold, allow direct communication between the user equipment and the second user equipment; and if the path loss value is greater than the first threshold, prohibit direct communication between the user equipment and the second user equipment.

With reference to the third aspect, or the first or the second or the third possible implementation manner of the third aspect, in a fourth possible implementation manner, the power parameter information of the second user equipment is a transmit power value of the second user equipment; and the third acquiring unit is configured to perform calculation according to the transmit power value of the second user equipment and a receive power value of the first message to obtain the path loss value.

With reference to the third aspect, or the first or the second or the third possible implementation manner of the third aspect, in a fifth possible implementation manner, the power parameter information of the second user equipment is a transmit power range or a power class of the second user equipment; and the third acquiring unit is configured to determine a maximum transmit power value of the second user equipment according to the transmit power range or the power class of the second user equipment; and perform calculation according to the maximum transmit power value of the second user equipment and a receive power value of the first message to obtain the path loss value.

With reference to the third aspect, or the first or the second or the third or the fourth or the fifth possible implementation manner of the third aspect, in a sixth possible implementation manner, the user equipment further includes a third receiving unit configured to receive the first threshold sent by a network server, where the network server includes an eNodeB, a BTS, a SGW, a PGW, a RNC, or a core network element; or configured to receive the first threshold sent by a third user equipment, where the third user equipment includes a cluster head or a Wi-Fi hotspot device.

With reference to the third aspect, or the first or the second or the third or the fourth or the fifth possible implementation manner of the third aspect, in a seventh possible implementation manner, the user equipment further includes a first storage unit and the first storage unit is configured to pre-store the first threshold.

With reference to the third aspect, or the first or the second or the third or the fourth or the fifth or the sixth or the seventh possible implementation manner of the third aspect, in an eighth possible implementation manner, the first message includes a discovery message, a paging message, a paging response message, a service message, or a test message.

With reference to the third aspect, or the first or the second or the third or the fourth or the fifth or the sixth or the seventh or the eighth possible implementation manner of the third aspect, in a ninth possible implementation manner, the power parameter information is indicated by a time resource, a frequency resource, or a code word resource for transmitting the first message or the second message.

According to a fourth aspect, another user equipment is provided, where the user equipment performs communication with a first user equipment, and the user equipment includes a first sending unit configured to send a first message to the first user equipment, where the first message carries power parameter information of the user equipment, and the power parameter information is used to obtain a path loss value according to receive power of the first message and the power parameter information of the user equipment, and determine, according to the path loss value, whether direct communication is allowed between the first user equipment and the user equipment.

In a first possible implementation manner of the fourth aspect, the first message includes a discovery message, a paging message, a paging response message, a service message, or a test message.

According to a fifth aspect, a system is provided and includes the user equipment in the third aspect and the user equipment in the fourth aspect.

In a first possible implementation manner of the fifth aspect, a network server is further included and configured to send a first threshold to a third user equipment, where the network server includes an eNodeB, a BTS, a SGW, a PGW, a RNC, or a core network element.

According to the foregoing communication control method of the user equipment, the user equipment, the network server, and the system, a path loss value is obtained using power parameter information of a user equipment sending a message and receive power of the message; and then it is determined, according to the path loss value, whether direct communication between user equipments is allowed. This can implement management and control on direct communication between the user equipments, prevent the user equipments from performing a direct communication service with an unsatisfactory power loss and unnecessary signaling interworking, and reduce electricity loss of the user equipments. In addition, this also prevents a direct communication service with poor communication quality from interfering with another communication service, and optimizes a network environment.

According to a sixth aspect, a communication control method is provided and includes receiving, by a first user equipment, a third message sent by a second user equipment, where the third message carries a power class of the second user equipment; matching a rule of direct communication according to a power class of the first user equipment and the power class of the second user equipment, where the rule specifies a power class condition under which direct communication can be performed; and determining, according to a result of the matching, whether direct communication is allowed between the first user equipment and the second user equipment.

In a first possible implementation manner of the sixth aspect, before the matching a rule of direct communication, the method further includes receiving the rule sent by a network server, where the network server includes an eNodeB, a BTS, a SGW, a PGW, a RNC, or a core network element; or receiving the rule sent by a third user equipment, where the third user equipment includes a cluster head or a Wi-Fi hotspot device.

In a second possible implementation manner of the sixth aspect, the rule is pre-stored in the first user equipment.

With reference to the sixth aspect, or the first or the second possible implementation manner of the sixth aspect, in a third possible implementation manner, the third message includes a discovery message, a paging message, a paging response message, a service message, or a test message.

With reference to the sixth aspect, or the first or the second or the third possible implementation manner of the sixth aspect, in a fourth possible implementation manner, the power class is indicated by a time resource, a frequency resource, or a code word resource for transmitting the third message.

According to a seventh aspect, another communication control method is provided and includes sending, by a second user equipment, a third message to a first user equipment, where the third message carries power parameter information of the second user equipment, and the power parameter information is used to obtain a path loss value according to receive power of the third message and the power parameter information of the second user equipment, and determine, according to the path loss value, whether direct communication is allowed between the first user equipment and the second user equipment.

In a first possible implementation manner of the seventh aspect, the third message includes a discovery message, a paging message, a paging response message, a service message, or a test message.

According to an eighth aspect, another user equipment is provided, where the user equipment performs communication with a second user equipment, and the user equipment includes a fourth receiving unit configured to receive a third message sent by the second user equipment, where the third message carries a power class of the second user equipment; a matching unit configured to match a rule of direct communication according to a power class of the user equipment and the power class of the second user equipment, where the rule specifies a power class condition under which direct communication can be performed; and a second determining unit configured to determine, according to a result of the matching, whether direct communication is allowed between the user equipment and the second user equipment.

In a first possible implementation manner of the eighth aspect, the user equipment further includes a fifth receiving unit configured to receive the rule sent by a network server, where the network server includes an eNodeB, a BTS, a SGW, a PGW, a RNC, or a core network element; or configured to receive the rule sent by a third user equipment, where the third user equipment includes a cluster head or a Wi-Fi hotspot device.

In a second possible implementation manner of the eighth aspect, the user equipment further includes a second storage unit configured to pre-store the rule.

With reference to the eighth aspect, or the first or the second possible implementation manner of the eighth aspect, in a third possible implementation manner, the third message includes a discovery message, a paging message, a paging response message, a service message, or a test message.

With reference to the eighth aspect, or the first or the second or the third possible implementation manner of the eighth aspect, in a fourth possible implementation manner, the power class is indicated by a time resource, a frequency resource, or a code word resource for transmitting the third message.

According to a ninth aspect, another user equipment is provided, where the user equipment performs communication with a first user equipment, and the user equipment includes a second sending unit configured to send a third message to the first user equipment, where the third message carries a power class of the user equipment, and the power class is used to match a rule of direct communication according to a power class of the first user equipment and the power class of the user equipment, and determine, according to a result of the matching, whether direct communication is allowed between the first user equipment and the user equipment.

In a first possible implementation manner of the ninth aspect, the third message includes a discovery message, a paging message, a paging response message, a service message, or a test message.

According to a tenth aspect, a system is provided and includes the user equipment in the eighth aspect and the user equipment in the ninth aspect.

In a first possible implementation manner of the tenth aspect, a network server is further included and configured to send the rule to the user equipment in the eighth aspect, where the network server includes an eNodeB, a BTS, a SGW, a PGW, a RNC, or a core network element.

According to the foregoing communication control method of the user equipment, the user equipment, the network server, and the system, by matching power parameter classes of user equipments with a rule of establishing direct communication, it is determined whether direct communication is allowed between the user equipments. This can implement management and control on direct communication of the user equipments, prevent the user equipments from performing an unsatisfactory direct communication service and unnecessary signaling interworking, and reduce electricity loss of the user equipments. In addition, this also prevents a direct communication service with poor communication quality from interfering with another communication service, and optimizes a network environment.

According to an eleventh aspect, another communication control method is provided and includes receiving, by a first user equipment, a fourth message sent by a second user equipment; acquiring receive power of the fourth message; and determining, according to the receive power of the fourth message, whether direct communication is allowed between the first user equipment and the second user equipment.

In a first possible implementation manner of the eleventh aspect, the determining, according to the receive power of the fourth message, whether direct communication is allowed between the first user equipment and the second user equipment includes, if the receive power is greater than a second threshold, allowing direct communication between the first user equipment and the second user equipment; and if the receive power is less than the second threshold, prohibiting direct communication between the first user equipment and the second user equipment.

With reference to the eleventh aspect, or the first possible implementation manner of the eleventh aspect, in a second possible implementation manner of the eleventh aspect, before the determining, according to the receive power of the fourth message, whether direct communication is allowed between the first user equipment and the second user equipment, the method further includes receiving the second threshold sent by a network server, where the network server includes an eNodeB, a BTS, a SGW, a PGW, a RNC, or a core network element; or receiving the second threshold sent by a third user equipment, where the third user equipment includes a cluster head or a Wi-Fi hotspot device.

With reference to the eleventh aspect, or the first possible implementation manner of the eleventh aspect, in a third possible implementation manner of the eleventh aspect, the second threshold is pre-stored in the first user equipment.

With reference to the eleventh aspect, or the first or the second or the third possible implementation manner of the eleventh aspect, in a fourth possible implementation manner of the eleventh aspect, the fourth message includes a discovery message, a paging message, a paging response message, a service message, or a test message.

According to a twelfth aspect, another user equipment is provided, where the user equipment performs communication with a second user equipment, and the user equipment includes a sixth receiving unit configured to receive a fourth message sent by the second user equipment; a fourth acquiring unit configured to acquire receive power of the fourth message; and a third determining unit configured to determine, according to the receive power of the fourth message, whether direct communication is allowed between the user equipment and the second user equipment.

In a first possible implementation manner of the twelfth aspect, the third determining unit is configured to, if the receive power is greater than a second threshold, allow direct communication between the user equipment and the second user equipment; and if the receive power is less than the second threshold, prohibit direct communication between the user equipment and the second user equipment.

With reference to the twelfth aspect, or the first possible implementation manner of the twelfth aspect, in a second possible implementation manner of the twelfth aspect, the user equipment further includes a seventh receiving unit configured to receive the second threshold sent by a network server, where the network server includes an eNodeB, a BTS, a SGW, a PGW, a RNC, or a core network element; or configured to receive the second threshold sent by a third user equipment, where the third user equipment includes a cluster head or a Wi-Fi hotspot device.

With reference to the twelfth aspect, or the first possible implementation manner of the twelfth aspect, in a third possible implementation manner of the twelfth aspect, the user equipment further includes a third storage unit configured to pre-store the second threshold.

With reference to the twelfth aspect, or the first or the second or the third possible implementation manner of the twelfth aspect, in a fourth possible implementation manner of the twelfth aspect, the fourth message includes a discovery message, a paging message, a paging response message, a service message, or a test message.

According to a thirteenth aspect, a system is provided and includes the user equipment and the second user equipment in the twelfth aspect, where the second user equipment is configured to send the fourth message to the user equipment in the twelfth aspect.

In a first possible implementation manner of the thirteenth aspect, a network server is further included and configured to send the second threshold to the user equipment of the twelfth aspect, where the network server includes an eNodeB, a BTS, a SGW, a PGW, a RNC, or a core network element.

According to the foregoing communication control method of the user equipment, the user equipment, the network server, and the system, using receive power of a message, it is determined whether direct communication is allowed between user equipments. This can implement management and control on direct communication of the user equipments, prevent the user equipments from performing a direct communication service with unsatisfactory message receive power and unnecessary signaling interworking, and reduce electricity loss of the user equipments. In addition, this also prevents a direct communication service with poor communication quality from interfering with another communication service, and optimizes a network environment.

The foregoing solution or another solution can also be obtained from content of the following embodiments.

DESCRIPTION OF EMBODIMENTS

Figure 1:
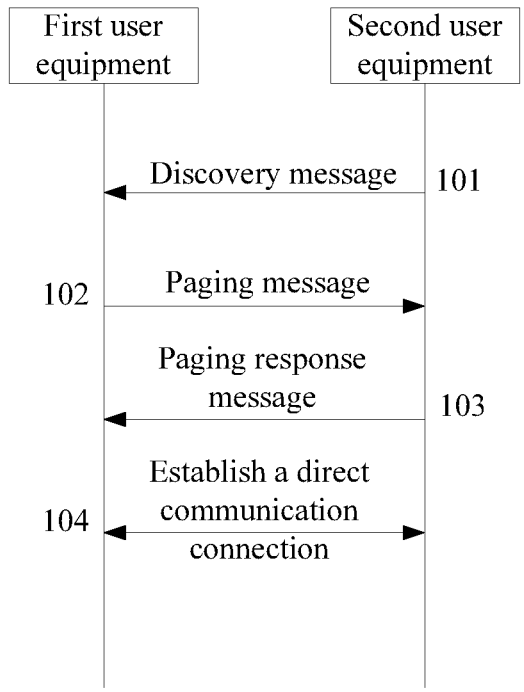
FIG. 1 is a schematic diagram of signaling for establishing direct communication disclosed by an embodiment of the present invention.

To make the objectives, technical solutions, and advantages of the present invention more comprehensible, the following further describes specific embodiments of the present invention in detail with reference to the accompanying drawings. To understand the present invention comprehensively, a plurality of specific details is mentioned in the following detailed description. However, persons skilled in the art should understand that these details may not be required for implementation of the present invention. In other examples, a well-known method, process, component, circuit, and the like are not described in detail, to avoid unnecessary confusion on the embodiments. The described embodiments are a part rather than all of the embodiments of the present invention. All other embodiments obtained by persons of ordinary skill in the art based on the embodiments of the present invention without creative efforts shall fall within the protection scope of the present invention.

First, it should be noted that a user equipment described in the embodiments of the present invention includes but is not limited to a smart phone, a tablet computer, a smart appliance, a Global Positioning System (GPS) device, a Wi-Fi hotspot device, a wireless Internet access device, smart glasses, a smart watch, another wearable smart device, or the like. Some embodiments use a Long Term Evolution (LTE) network as an example for description. However, the present invention can not only be applied to a LTE network but also use any one of a plurality of communications standards, protocols, and technologies, such as a Global System for Mobile Communications (GSM), Enhanced Data rates for GSM Evolution (EDGE), Worldwide Interoperability for Microwave Access (Wi-MAX) (802.16), Wideband Code Division Multiple Access (WCDMA), Time Division Multiple Access (TDMA), Code Division Multiple Access (CDMA), Wi-Fi, Bluetooth, Zig-bee, 802.15, voice over internet protocol (VoIP), Short Message Service (SMS) or another appropriate communications protocol or technology, including a communications protocol not yet developed or determined before the submission date of the application. On the other hand, the network in the embodiments may be the Internet, one or more internal networks, a local area network (LAN), a wide area network (WLAN), a storage area network (SAN), or the like, or an appropriate combination thereof.

In some procedures described below, a plurality of operations performed in a particular sequence is included. However, it should be clearly understood that these operations may be executed not in a sequence described in the specification, or may be executed in parallel. A sequence number of an operation, such as 101 or 102, is merely used for distinguishing each operation, and the sequence number itself does not represent any execution sequence. In addition, these procedures may include more or fewer operations, and these operations may be executed sequentially or in parallel.

It should be noted that a description in the specification, such as "first" or "second", is used to distinguish different messages, devices, modules, and so on, neither representing a sequence nor imposing a limitation that the "first" and "second" are of different types. "If" in this specification represents satisfying a certain condition or state, and includes a meaning such as "when", "after a condition is satisfied", and "a determination is established". "Message" is a carrier for carrying several pieces of information, and includes a plurality of forms, such as signaling, a communication signal, and a data message.

For direct communication in this specification, when direct communication is performed between user equipments, a certain user equipment directly sends a message to another user equipment, not requiring forwarding and control of a base station or a third-party node.

A direct communication connection between user equipments may be established in the following manners:

As shown in FIG. 1, a manner of establishing direct communication between user equipments is provided.

101. A first user equipment receives a discovery message from a second user equipment.

The discovery message may be broadcast by a second user equipment within a signal range, and the first user equipment may receive the discovery message within a transmit signal range of the second user equipment.

102. The first user equipment sends a paging message to the second user equipment.

If allowed to establish a direct communication connection with the second user equipment, the first user equipment sends the paging message to the second user equipment according to the received discovery message.

103. The second user equipment sends a paging response message to the first user equipment.

104. The first user equipment establishes a direct communication connection with the second user equipment to perform direct communication.

Figure 2:
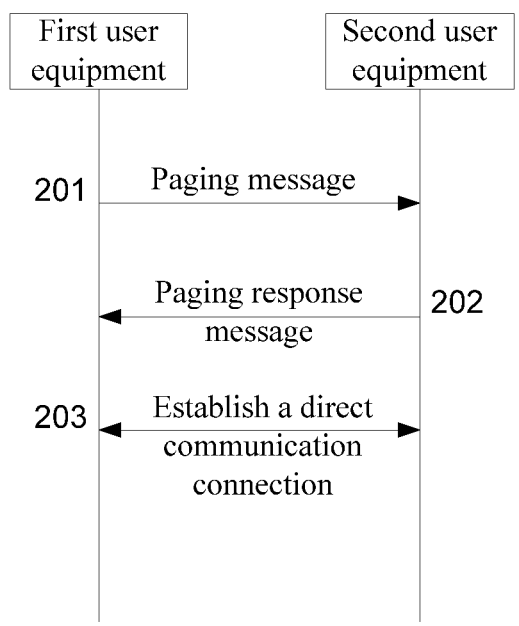
FIG. 2 is another schematic diagram of signaling for establishing direct communication disclosed by an embodiment of the present invention.

As shown in FIG. 2, another manner of establishing direct communication between user equipments is provided.

201. A first user equipment sends a paging message to a second user equipment.

202. The second user equipment sends a paging response message to the first user equipment.

203. The first user equipment establishes a direct communication connection with the second user equipment to perform direct communication.

In some specific situations, if the second user equipment is known to the first user equipment, or the second user equipment and the first user equipment have established a direct communication connection, in comparison with the previous manner of establishing direct communication, the first user equipment does not need to receive a discovery message sent by the second user equipment, that is, the first user equipment may initiate the paging message to the second equipment to establish the direct communication connection.

Figure 3:
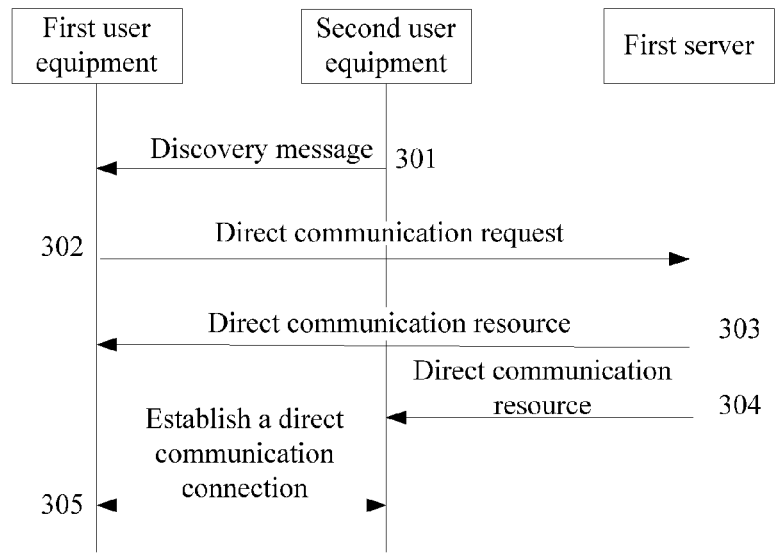
FIG. 3 is still another schematic diagram of signaling for establishing direct communication disclosed by an embodiment of the present invention.

As shown in FIG. 3, still another manner of establishing direct communication between user equipments is provided.

301. A first user equipment receives a discovery message from a second user equipment.

302. The first user equipment sends, to a first server, a direct communication request for the second user equipment.

303. The first server allocates a direct communication resource to the first user equipment.

304. The first server allocates a direct communication resource to the second user equipment.

305. The first user equipment and the second user equipment, according to allocated direct communication resources, establish a direct communication connection to perform direct communication.

In this solution, the first server serves both the first user equipment and the second user equipment, and allocates the direct communication resources to the first user equipment and the second user equipment, helping the first user equipment and the second user equipment establish the direct communication connection. The first server may be a base station device, such as an eNodeB, a BTS, a SGW, a PGW, or a RNC, or may also be a user equipment management device, such as a cluster head Cluster head or a Wi-Fi hotspot device. The direct communication resources in the embodiment may be time slot resources in a time division multiplexing multiple access system, may be frequency resources in a frequency division multiplexing multiple access system, or may be code word resources in a code division multiplexing multiple access system.

Optionally, when failing to receive the discovery message of the second user equipment, the first user equipment may also directly send, to the first server, a direct communication request for the second user equipment.

Figure 4:
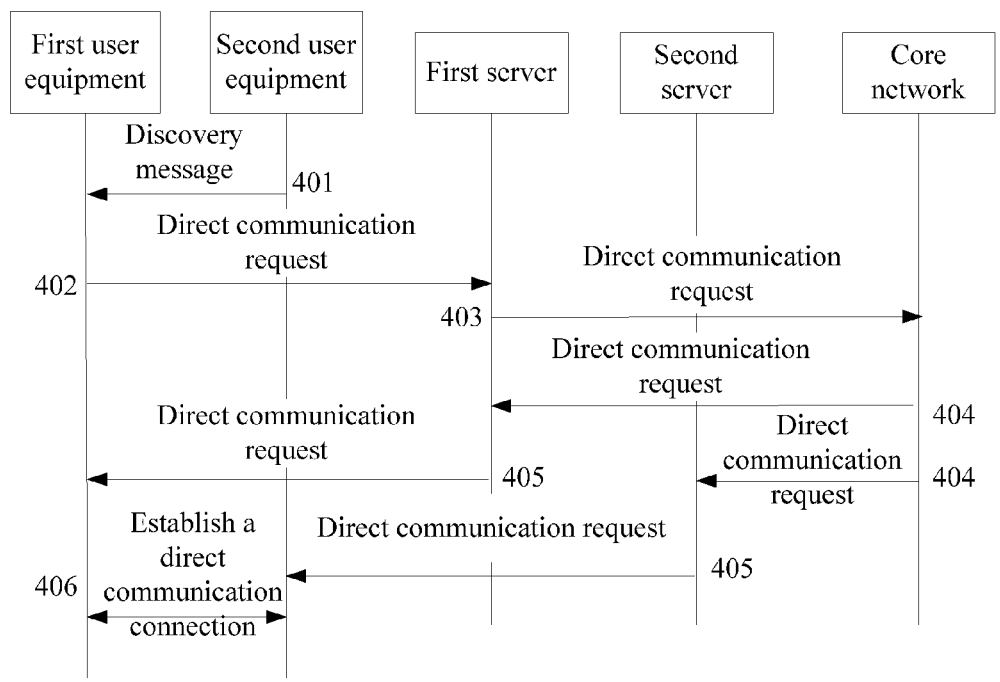
FIG. 4 is yet another schematic diagram of signaling for establishing direct communication disclosed by an embodiment of the present invention.

As shown in FIG. 4, yet another manner of establishing direct communication between user equipments is provided.

401. A first user equipment receives a discovery message from a second user equipment.

402. The first user equipment sends, to a first server, a direct communication request for the second user equipment.

403. The first server sends, to a core network, the direct communication request for the second user equipment sent by the first user equipment.

404. The core network allocates a direct communication resource to the first user equipment and the second user equipment separately, delivers the direct communication resource of the first user equipment to the first server, and delivers the direct communication resource of the second user equipment to a second server serving the second user equipment.

405. The first server and the second server deliver the direct communication resources to the first user equipment and the second user equipment, respectively.

406. The first user equipment and the second user equipment, according to the allocated direct communication resources, establish a direct communication connection to perform direct communication.

In this solution, the first server serves the first user equipment, and the second server serves the second user equipment. The core network allocates the direct communication resources to the first user equipment and the second user equipment, and delivers the direct communication resources to the first server and the second server, helping the first user equipment and the second user equipment establish a direct communication connection. The first server and the second server may be a network-side server each, for example, a base station device, such as an eNodeB, a BTS, an SGW, a PGW, or an RNC, or may also be a user equipment management device, such as a user-side cluster head or a Wi-Fi hotspot device.

Optionally, when failing to receive the discovery message of the second user equipment, the first user equipment may also directly send, to the first server, a direct communication request for the second user equipment.

During a process that direct communication is established or direct communication is performed between user equipments, due to a difference in transmit power of each user equipment and a distance between each other, path loss may be excessively large or signal receive power may be unsatisfactory, affecting quality of the direct communication. In addition, for some terminals that are excessively far from each other and whose transmit power and receive power cannot ensure the quality of the direct communication, if a process of establishing direct communication is executed or a direct communication service is performed, not only the quality of communication is poor, but also another communication service within a certain range may also be interfered with, causing unnecessary signaling waste and electricity loss of the user equipments.

In summary, a control mechanism needs to be provided to manage and control direct communication not meeting a condition and optimize a network environment.

Figure 5:
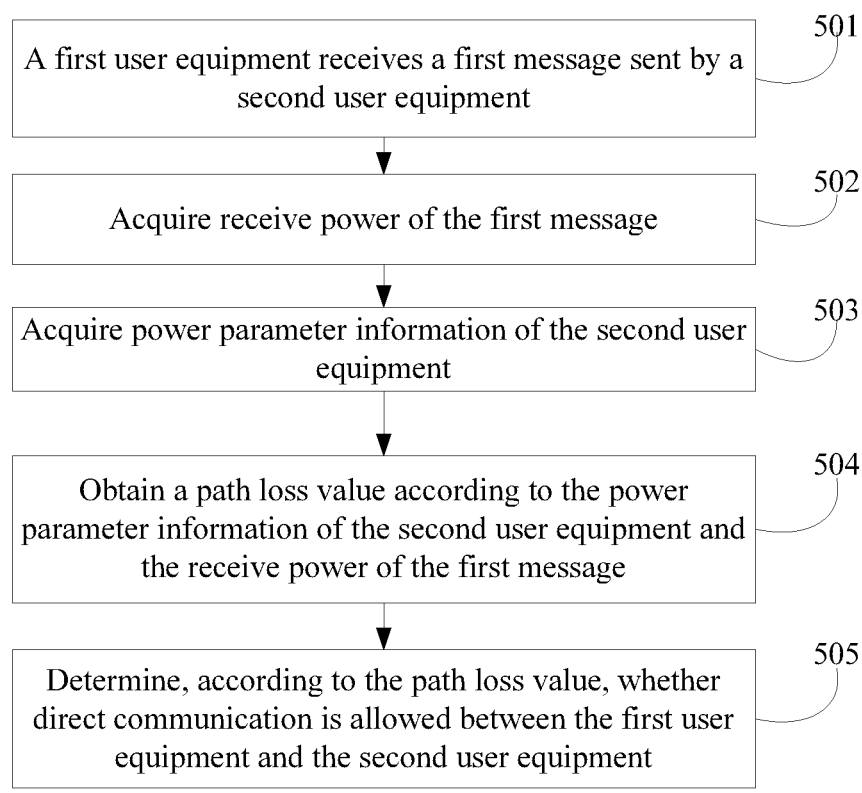
FIG. 5 is a schematic flowchart of a communication control method disclosed by an embodiment of the present invention.

Referring to FIG. 5, an embodiment of the present invention provides a communication control method, including the following steps:

501. A first user equipment receives a first message sent by a second user equipment.

502. Acquire receive power of the first message.

503. Acquire power parameter information of the second user equipment.

504. Obtain a path loss value according to the power parameter information of the second user equipment and the receive power of the first message.

505. Determine, according to the path loss value, whether direct communication is allowed between the first user equipment and the second user equipment.

According to the communication control method of this embodiment, a path loss value is obtained using power parameter information of a user equipment sending a message and receive power of the message; and then it is determined, according to the path loss value, whether direct communication between user equipments is allowed. This can implement management and control on direct communication of the user equipments, prevent the user equipments from performing a direct communication service with an unsatisfactory power loss and unnecessary signaling interworking, and reduce electricity loss of the user equipments. In addition, this also prevents a direct communication service with poor communication quality from interfering with another communication service, and optimizes a network environment.

Optionally, steps 502 to 504 may be performed by the first user equipment, may also be performed by another device, such as another user equipment connected to the first user equipment, or a test, calculation, or control apparatus connected to the first user equipment, or may also be performed by a network server, an access network element, a core network element, or another possible execution entity. Persons of ordinary skill in the art can know that as long as the receive power of the first message received by the first user equipment and the power parameter information of the second user equipment can be obtained, and a path loss value of power can be obtained by calculating or looking up a table according to the receive power and the power parameter information, and then it is determined, according to the path loss value, whether direct communication is allowed between the first user equipment and the second user equipment, the embodiment of the present invention can be executed. The entity for executing the preceding steps is not limited in the embodiment of the present invention.

Optionally, the receive power of the first message may be obtained in a manner of measurement, may be measured by the first user equipment, or may also be measured by another apparatus or device, which is not limited in the present invention.

Optionally, when it is determined whether direct communication is allowed between the first user equipment and the second user equipment, if the path loss value is less than a first threshold, direct communication is allowed between the first user equipment and the second user equipment; and if the path loss value is greater than the first threshold, direct communication is prohibited between the first user equipment and the second user equipment. When the path loss value is equal to the first threshold, direct communication may be allowed between the first user equipment and the second user equipment, or may also be prohibited between the first user equipment and the second user equipment, thereby preventing the user equipments from performing a direct communication process with relatively high power loss.

Optionally, "direct communication is allowed between the first user equipment and the second user equipment" in the embodiment of the present invention, for example, may be that a process of establishing direct communication is performed by the first user equipment and the second user equipment. For example, the process of establishing a direct communication connection shown in FIG. 1 to FIG. 4, includes one or more of the following steps during the processes that the second user equipment sends a discovery message to the first user equipment, the first user equipment sends a paging message to the second user equipment, or the second user equipment sends a paging acknowledgement (ACK) message to the first user equipment. "Performing direct communication" may also be that the first user equipment and the second user equipment, after establishing the direct communication connection, perform a direct communication service, for example, to perform a voice service or perform a data service. "Allowed" indicates that the first user equipment and the second user equipment may perform direct communication immediately, or may also perform direct communication after some time, which is not limited in the embodiment of the present invention.

Optionally, "direct communication is prohibited between the first user equipment and the second user equipment" in the embodiment of the present invention may be that the process of establishing the direct communication connection is interrupted by the first user equipment and the second user equipment, for example, after receiving a discovery message sent by the second user equipment, the first user equipment does not send a paging message to the second user equipment, or after receiving a paging message sent by the second user equipment, the first user equipment sends a paging negative acknowledgement (NACK) message to the second user equipment; or may also be that the first user equipment and the second user equipment stop performing the direct communication service or end the direct communication connection.

Optionally, the first message may be a discovery message, a paging message, a paging response message, a service message, or a test message. The service message may be a data service message or a voice service message that the second user equipment sends to the first user equipment when performing a direct communication service with the first user equipment. The test message may be a message that is used to test the receive power of the message and sent by the second user equipment at any time.

The power parameter information of the second user equipment may be specific power parameter information when the second user equipment sends the first message, or may also be power parameter information when the second user equipment transmits a signal or message in normal operation. The power when the second user equipment sends the first message may be different from transmit power of the second user equipment in normal operation, which is not limited in the present invention.

Optionally, the acquiring power parameter information of the second user equipment includes carrying, by the first message, the power parameter information of the second user equipment, and acquiring power parameter information of the second user equipment carried in the first message; or receiving the second message, where the second message carries the power parameter information of the second user equipment, and acquiring the power parameter information of the second user equipment carried in the second message.

The first message sent by the second user equipment may carry the power parameter information of the second user equipment, so that the power parameter information of the second user equipment may be extracted from the first message; the power parameter information of the second user equipment may also be carried by another message, for example, the second message, where the second message may be sent by the second user equipment, may be sent by another user equipment, or may also be sent by a network-side server, for example, a base station device, such as an eNodeB, a BTS, an SGW, a PGW, or an RNC, or may be sent by a user equipment management device, such as a user-side Cluster head or a Wi-Fi hotspot device. For example, a server eNodeB broadcasts power parameter information for transmitting a signal by a user equipment within a serving range of the server eNodeB, specifying that all or some of user equipments need to transmit a signal using the power parameter information. Then, the second message may be a broadcast message that the eNodeB sends to specify the power parameter information of the user equipment.

Optionally, the power parameter information of the second user equipment may be a specific transmit power value of the second user equipment, or may also be a transmit power range or a power class of the second user equipment.

If the power parameter information is a transmit power value, the obtaining a path loss value according to the power parameter information of the second user equipment and the receive power of the first message includes calculating the path loss value according to the transmit power value of the second user equipment and the receive power of the first message. For example, the transmit power value of the second user equipment is 23 Decibel-milliwatt (decibels above one milliwatt in 600 ohms, dBm), the receive power is 5 dBm, and then the path loss value is: Transmit power value−Receive power=18 dBm. It should be noted that the foregoing manner of calculating the path loss value is merely an example, and the path loss value may also be obtained through calculation in another manner or using another formula according to the transmit power value and the receive power. In addition, the path loss value may also be obtained by looking up a table, querying a database, or in another manner requiring no calculation. For example, a plurality of transmit power values, receive power corresponding to the transmit power values, and corresponding path loss values are stored in the database, and the path loss value may be obtained by searching for a corresponding transmit power value and receive power.

If the power parameter information of the second user equipment is a transmit power range or a power class of the second user equipment, the obtaining a path loss value according to the power parameter information of the second user equipment and the receive power of the first message includes determining a maximum transmit power value of the second user equipment according to the transmit power range or the power class of the second user equipment; and performing calculation according to a maximum transmit power value of the second user equipment and a receive power value of the first message to obtain the path loss value. For example, the transmit power range of the second user equipment is [23 dBm, 20 dBm], and it is determined that the maximum transmit power of the second user equipment is 23 dBm, the receive power is 5 dBm, and then the path loss value is: Transmit power value−Receive power=18 dBm. The power range herein is a quantitative value, and therefore, in a message, the power range thereof may be represented by a discrete bit value. For example, 00 represents [23 dBm, 20 dBm], 01 represents [20 dBm, 17 dBm], and 10 represents [17 dBm, 14 dBm]. For another example, a user equipment has three power classes: high, medium, and low, and the power class of the second user equipment is high. The maximum transmit power value corresponding to the high power class is 23 dBm, the receive power is 5 dBm, and then the path loss value is: Transmit power value−Receive power=18 dBm. For the power class of the second user equipment, the maximum transmit power value or another power value used for calculating the path loss value may also be determined according to the power class of the second user equipment. In a message, the power class of the second user equipment may be represented by a discrete bit value, for example, 00 represents a high power class, 01 represents a low power class, and 10 represents a medium power class. A path loss value obtained through calculation using the maximum transmit power value is a maximum path loss value theoretically. The path loss value may also be obtained through calculation using the receive power and an intermediate value, a minimum value, or any power value within the power range, which is not limited in the present invention.

It should be noted that the foregoing manner of calculating the path loss value is merely an example, and the path loss value may also be obtained through calculation in another manner or using another formula according to the transmit power range or the power class, and the receive power. In addition, the path loss value may also be obtained by looking up a table, querying a database, or in another manner requiring no calculation. For example, a plurality of power classes, corresponding receive power, and corresponding path loss values are stored in the database, and the path loss value may be obtained by searching for a corresponding power class and receive power.

The foregoing manner that the power parameter information is indicated by a bit value of the first message or the second message is merely an optional manner. In addition, the power parameter information may also be indicated in a manner of a physical resource. For example, different time resources indicate different power parameter information, a time resource 1 indicates [23 dBm, 20 dBm], a time resource 2 indicates [20 dBm, 17 dBm], and a time resource 3 indicates [17 dBm, 14 dBm]. For example, it is defined that in a system message, a subframe a corresponds to [23 dBm, 20 dBm], a subframe b corresponds to [20 dBm, 17 dBm], and a subframe c corresponds to [17 dBm, 14 dBm]. When the first message is sent in the subframe a, it indicates that the transmit power of the first message is within a range of [23 dBm, 20 dBm], or a maximum transmit power value of the user equipment transmitting a signal is 23 dBm. In addition, different power parameter information may also be indicated using different frequency resources, different code division resources represent different power parameter information, or different time-frequency-code resource combinations represent different power parameter information. The power parameter information is indicated by a time resource, a frequency resource, or a code word resource for transmitting the first message, without the need to occupy a byte of the message, which is simpler and more practical.

Optionally, before the determining whether direct communication is allowed between the first user equipment and the second user equipment in step 505, the method further includes receiving a first threshold sent by a network server, where the network server includes an eNodeB, a BTS, an SGW, a PGW, an RNC, or a core network element; or receiving a first threshold sent by a third user equipment, where the third user equipment includes a Cluster head or a Wi-Fi hotspot device. In addition, the first threshold may also be pre-stored in the first user equipment, and using the first threshold pre-stored in the first user equipment, it is determined whether direct communication with the second user equipment is performed. Pre-stored herein indicates that a threshold is written into the first user equipment upon delivery, or a threshold on the first user equipment is set or changed in use. In this embodiment, a first threshold sent by a network server or another user equipment is received to implement control on direct communication between user equipments within a system range, which meets a requirement of a network provider, a telecommunications operator, and a home network owner for controlling a direct communication network.

The embodiment of the present invention further provides a computer program product, including computer program code, and when the computer program code is executed by a computer, the computer performs all steps of the foregoing embodiment.

Figure 6A:
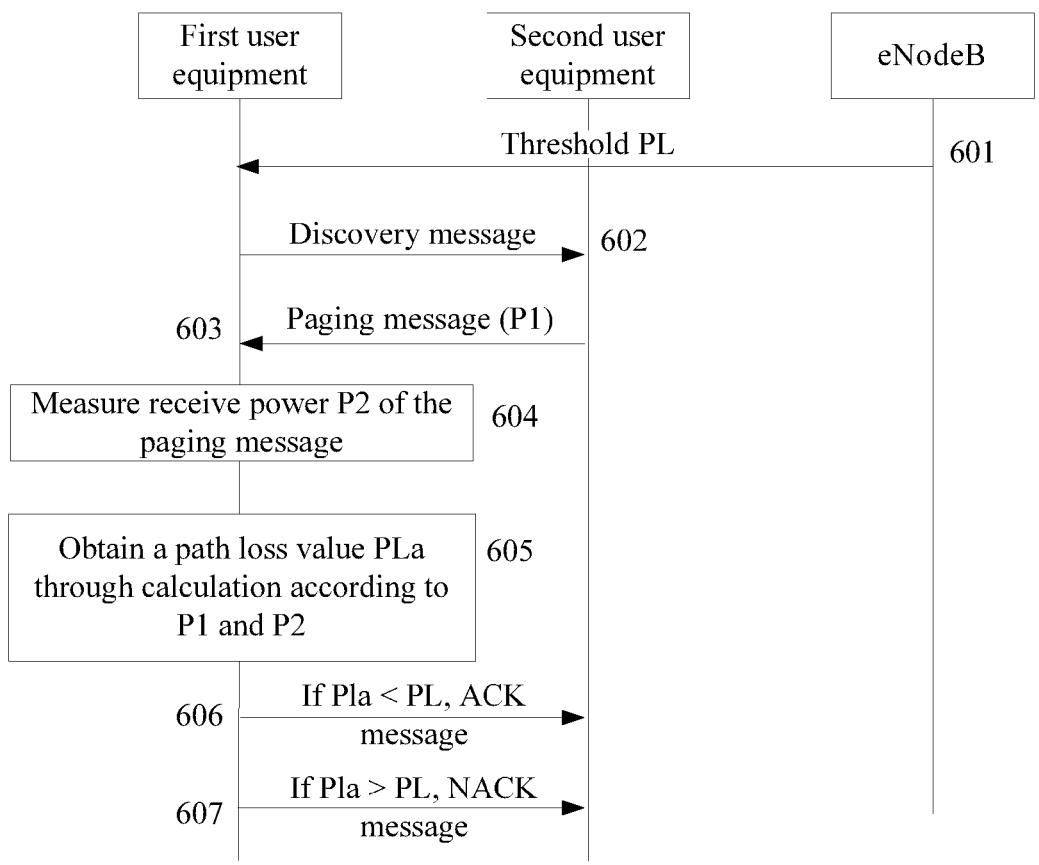
FIG. 6A is a schematic diagram of signaling of a communication control method disclosed by an embodiment of the present invention.

FIG. 6A is another embodiment of the present invention, including the following steps:

601. A first user equipment receives a threshold PL sent by an eNodeB.

602. The first user equipment sends a discovery message to a second user equipment.

603. The second user equipment sends a paging message to the first user equipment, where the paging message carries a transmit power value P1 of the second user equipment.

604. The first user equipment measures receive power P2 of the paging message.

605. The first user equipment obtains a path loss value PLa through calculation according to P1 and P2.

606. If PLa<PL, the first user equipment sends a paging ACK message to the second user equipment.

607. If PLa>PL, the first user equipment sends a paging NACK message to the second user equipment.

In this embodiment, the eNodeB sends the threshold PL to the first user equipment. During a process of establishing a direct communication connection with another user equipment, the first user equipment determines, based on the threshold PL, whether the path loss value PLa meets a requirement of the eNodeB; if the requirement is met, a paging ACK message is sent, allowing the first user equipment to perform direct communication; if the requirement is not met, a paging NACK message is sent, prohibiting the first user equipment from performing direct communication. Therefore, this implements control by a system on direct communication between user equipments within a range of the system, prevents the user equipments from performing a direct communication service with an unsatisfactory power loss and unnecessary signaling interworking, and reduces electricity loss of the user equipments. In addition, this also prevents a direct communication service with poor communication quality from interfering with another communication service, and optimizes a network environment.

Figure 6B:
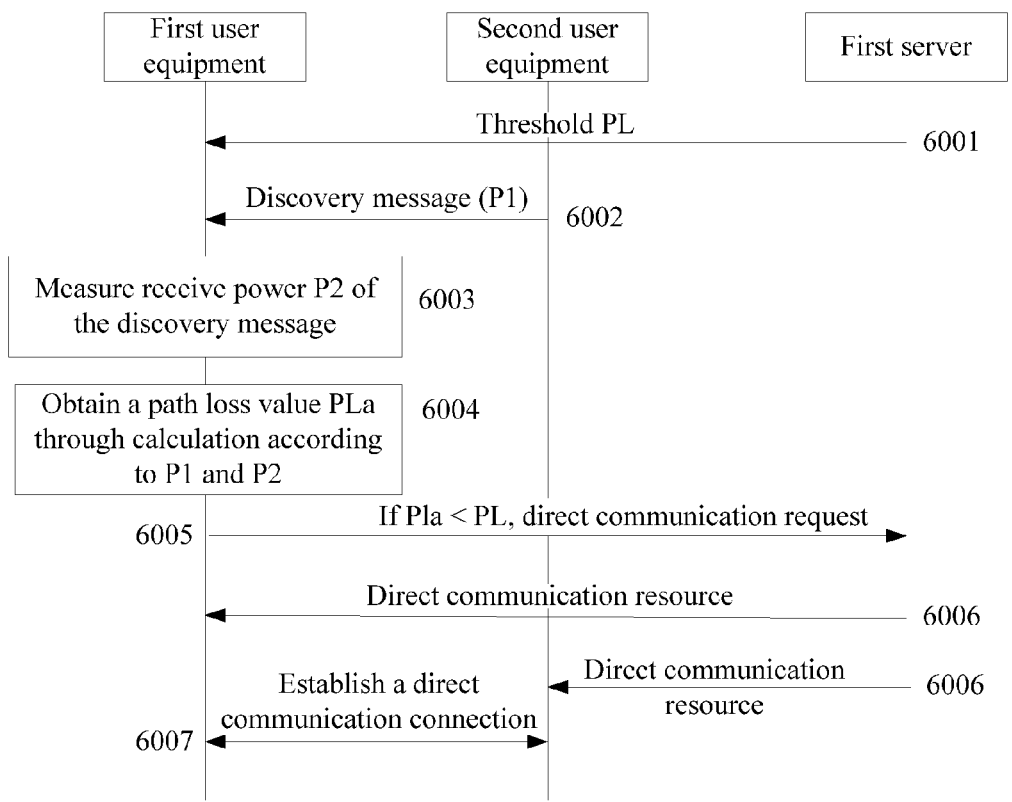
FIG. 6B is a schematic diagram of signaling of another communication control method disclosed by an embodiment of the present invention.

FIG. 6B is another embodiment of the present invention, including the following steps:

6001. A first user equipment receives a threshold PL sent by a first server.

6002. A second user equipment sends a discovery message to the first user equipment, where the discovery message carries a transmit power value P1 of the second user equipment.

6003. The first user equipment measures receive power P2 of the discovery message.

6004. The first user equipment obtains a path loss value PLa through calculation according to P1 and P2.

6005. If PLa<PL, the first user equipment sends, to the first server, a direct communication request for the second user equipment; and if PLa>PL, the first user equipment does not send, to the first server, a direct communication request for the second user equipment.

6006. The first server allocates direct communication resources to the first user equipment and the second user equipment.

6007. The first user equipment and the second user equipment, according to the allocated direct communication resources, establish a direct communication connection.

In this embodiment, the first server sends the threshold PL to the first user equipment. During a process of establishing a direct communication connection with another user equipment, the first user equipment determines, based on the threshold PL, whether the path loss value PLa meets a requirement of the first server; if the requirement is met, a direct communication request is sent to the first server to request allocation of a direct communication resource, allowing the first user equipment to perform direct communication; and if the requirement is not met, a direct communication request is not sent, prohibiting the first user equipment from performing direct communication. Therefore, this implements control by a system on direct communication between user equipments within a range of the system, prevents the user equipments from performing a direct communication service with an unsatisfactory power loss and unnecessary signaling interworking, and reduces electricity loss of the user equipments. In addition, this also prevents a direct communication service with poor communication quality from interfering with another communication service, and optimizes a network environment.

Figure 7:
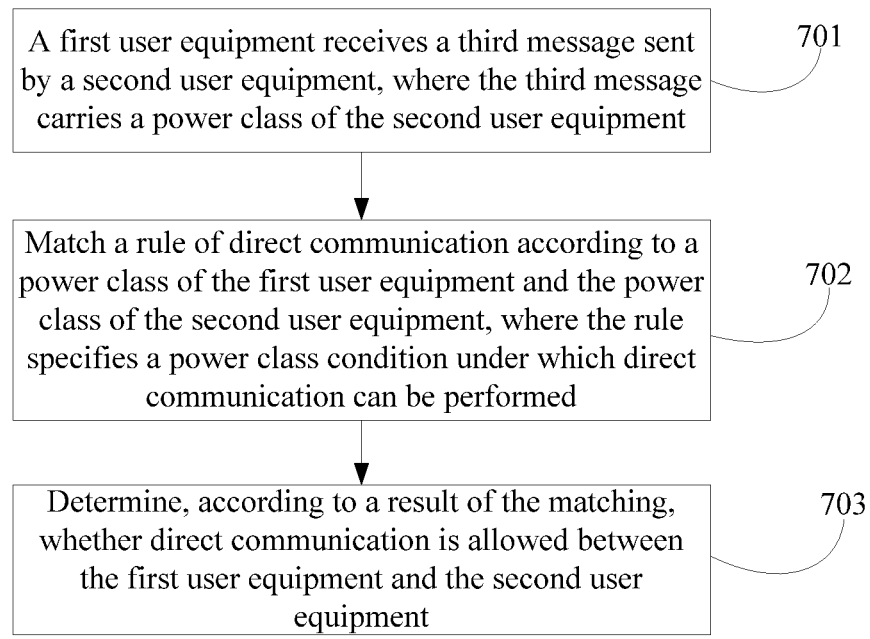
FIG. 7 is a schematic flowchart of a communication control method disclosed by an embodiment of the present invention.

As shown in FIG. 7, an embodiment of the present invention further provides a communication control method, including the following steps:

701. A first user equipment receives a third message sent by a second user equipment, where the third message carries a power class of the second user equipment.

702. Match a rule of direct communication according to a power class of the first user equipment and the power class of the second user equipment, where the rule specifies a power class condition under which direct communication can be performed.

703. Determine, according to a result of the matching, whether direct communication is allowed between the first user equipment and the second user equipment.

According to the foregoing communication control method, by matching power parameter classes of user equipments with a rule of establishing direct communication, it is determined whether direct communication is allowed between the user equipments. This can implement management and control on direct communication of the user equipments, prevent the user equipments from performing an unsatisfactory direct communication service and unnecessary signaling interworking, and reduce electricity loss of the user equipments. In addition, this also prevents a direct communication service with poor communication quality from interfering with another communication service, and optimizes a network environment.

For example, "rule" in the embodiment specifies a power class condition under which direct communication can be performed, and is a standard for determining whether a user equipment of a certain power class and a user equipment of a certain power class can perform direct communication, and may be a table, a function relationship, or the like. The following table is an example of "rule", and the power class is classified into three types: a high class, a medium class, and a low class.

|  | High Class | Medium Class | Low Class |
|---|---|---|---|
| High Class | Y | Y | Y |
| Medium Class | N | Y | Y |
| Low Class | N | N | Y |

The first row indicates a power class of a message sending device (the second user equipment); the first column indicates a power class of a message receiving device (the first user equipment); Y represents that direct communication can be performed; and N represents that direct communication cannot be performed. For example, the first user equipment receives a paging signal of the second user equipment, and acquires that the power class of the second user equipment is a "high class". However, the power class of the first user equipment is a high class. A matching result obtained by looking up the table is Y, and direct communication is allowed between the first user equipment and the second user equipment. For another example, the first user equipment receives a discovery signal of the second user equipment, and acquires that the power class of the second user equipment is a high class. However, the power class of the first user equipment is a medium class. A matching result obtained by looking up the table is N, and direct communication is prohibited between the first user equipment and the second user equipment.

In the foregoing embodiment, if the message receiving device is of a high power class, and the message receiving device also receives a message of the message sending device, the message sending device can always receive a response message of the message receiving device, no matter whether the power class of the message sending device is high, medium, or low. Therefore, the rule is as follows: when the message receiving device is of a high power class, the matching result is always Y; if the message sending device is of a high power class, and the message receiving device is of a medium power class or a low power class, but not a high power class, the message sending device may not receive a response message of the message receiving device, and the matching result is N. Therefore, direct communication with weak signals is avoided.

Optionally, steps 702 to 703 may be performed by the first user equipment, may also be performed by another device, such as another user equipment connected to the first user equipment, or a matching or control apparatus connected to the first user equipment, or may also be performed by a network server, an access network element, a core network element, or another possible execution entity. Persons of ordinary skill in the art can know that as long as a rule of direct communication can be matched according to the power class of the first user equipment and the power class of the second user equipment, and it is determined, according to a rule of the matching, whether direct communication is allowed between the first user equipment and the second user equipment, the embodiment of the present invention can be executed. The entity for executing the preceding steps is not limited in the embodiment of the present invention.

Optionally, "direct communication is allowed between the first user equipment and the second user equipment" in the embodiment of the present invention, for example, may be that a process of establishing direct communication is performed by the first user equipment and the second user equipment. For example, the process of establishing a direct communication connection shown in FIG. 1 to FIG. 4, includes one or more of the following steps in the processes that the second user equipment sends a discovery message to the first user equipment, the first user equipment sends a paging message to the second user equipment, or the second user equipment sends a paging ACK message to the first user equipment. "Performing direct communication" may also be that the first user equipment and the second user equipment, after establishing the direct communication connection, perform a direct communication service, for example, to perform a voice service or perform a data service. "Allowed" indicates that the first user equipment and the second user equipment may perform direct communication immediately, or may also perform direct communication after some time, which is not limited in the embodiment of the present invention.

Optionally, "direct communication is prohibited between the first user equipment and the second user equipment" in the embodiment of the present invention may be that the process of establishing the direct communication connection is interrupted by the first user equipment and the second user equipment, for example, after receiving a discovery message sent by the second user equipment, the first user equipment does not send a paging message to the second user equipment, or after receiving a paging message sent by the second user equipment, the first user equipment sends a paging NACK message to the second user equipment; or may also be that the first user equipment and the second user equipment stop performing the direct communication service or end the direct communication connection.

Optionally, after the matching is complete, a maximum transmit power value of the second user equipment may further be determined according to the power class of the second user equipment, as shown in the following table.

| | High Class [23 dBm, 20 dBm] | Medium Class [20 dBm, 17 dBm] | Low Class [17 dBm, 14 dBm] |
|---|---|---|---|
| Maximum Transmit Power Value | 23 dBm | 20 dBm | 17 dBM |

With reference to the foregoing embodiment, after the matching is complete, a path loss power value may further be obtained according to the receive power of the third message and the maximum transmit power value of the second user equipment that are acquired. If the path loss power value is greater than a threshold delivered by the system or pre-stored by the first user equipment, direct communication is prohibited between the first user equipment and the second user equipment; and if the path loss power value is less than a threshold delivered by the system or pre-stored by the first user equipment, direct communication is allowed between the first user equipment and the second user equipment.

Optionally, the third message may be a discovery message, a paging message, a paging response message, a service message, or a test message. The service message may be a data service message or a voice service message that the second user equipment sends to the first user equipment when performing a direct communication service with the first user equipment. The test message may be a message that is used to test the receive power of the message and sent by the second user equipment at any time.

A bit value of the third message may be used to indicate the power class, for example, 00 indicates a high class, 01 indicates a medium class, and 10 indicates a low class. In addition, the power class may also be indicated in a manner of a physical resource. For example, different time resources indicate different power classes, a time resource 1 indicates a high class, a time resource 2 indicates a medium class, and a time resource 3 indicates a low class. For example, it is defined that in a system message, a subframe a corresponds to the high class, a subframe b corresponds to the medium class, and a subframe c corresponds to the low class. Then, when the third message is sent in the subframe a, it indicates that the power class of the user equipment sending the third message is high. In addition, different power classes may also be indicated using different frequency resources, different code division resources represent different power classes, or different time-frequency-code resource combinations represent different power classes. The power class is indicated by a time resource, a frequency resource, or a code word resource for transmitting the third message, without the need to occupy a byte of the message, which is simpler and more practical.

Optionally, before the matching a rule of direct communication in step 702, the method further includes receiving a rule of direct communication sent by a network server, where the network server includes an eNodeB, a BTS, an SGW, a PGW, an RNC, or a core network element; or receiving a rule of direct communication sent by a third user equipment, where the third user equipment includes a Cluster head or a Wi-Fi hotspot device. In addition, the rule of direct communication may also be pre-stored in the first user equipment, and using the rule of direct communication pre-stored in the first user equipment, it is determined whether direct communication with the second user equipment is performed. Pre-stored herein indicates that one rule of direct communication is written into the first user equipment upon delivery, or the rule of direct communication on the first user equipment is set or changed in use. In this embodiment, the rule of direct communication sent by a network server or another user equipment is received to implement control on direct communication between user equipments within a system range, which meets a requirement of a network provider, a telecommunications operator, and a home network owner for controlling a direct communication network.

The embodiment of the present invention further provides a computer program product, including computer program code, and when the computer program code is executed by a computer, the computer performs all steps of the foregoing embodiment.

Figure 8:
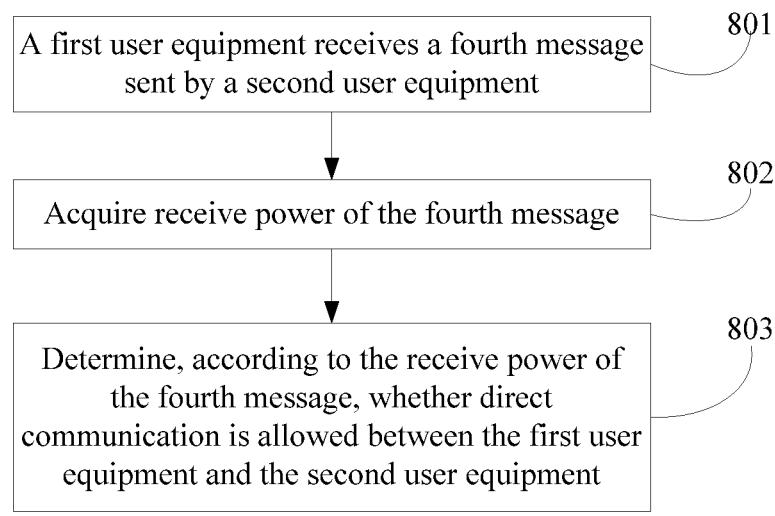
FIG. 8 is a schematic flowchart of a communication control method disclosed by an embodiment of the present invention.

As shown in FIG. 8, an embodiment of the present invention further provides a communication control method, including the following steps:

801. A first user equipment receives a fourth message sent by a second user equipment.

802. Acquire receive power of the fourth message.

803. Determine, according to the receive power of the fourth message, whether direct communication is allowed between the first user equipment and the second user equipment.

According to the foregoing communication control method, using receive power of a message, it is determined whether direct communication is allowed between user equipments. This can implement management and control on direct communication of the user equipments, prevent the user equipments from performing a direct communication service with unsatisfactory message receive power and unnecessary signaling interworking, and reduce electricity loss of the user equipments. In addition, this also prevents a direct communication service with poor communication quality from interfering with another communication service, and optimizes a network environment.

Optionally, steps 802 to 803 may be performed by the first user equipment, may also be performed by another device, such as another user equipment connected to the first user equipment, or a test, calculation, or control apparatus connected to the first user equipment, or may also be performed by a network server, an access network element, a core network element, or another possible execution entity. Persons of ordinary skill in the art can know that as long as the receive power of the fourth message received by the first user equipment can be obtained, and it can be determined, according to the receive power, whether direct communication is allowed between the first user equipment and the second user equipment, the embodiment of the present invention can be executed. The entity for executing the preceding steps is not limited in the embodiment of the present invention.

Optionally, the receive power of the fourth message may be obtained in a manner of measurement, may be measured by the first user equipment, or may also be measured by another apparatus or device, which is not limited in the present invention.

Optionally, when it is determined whether direct communication is allowed between the first user equipment and the second user equipment, if the receive power is greater than a second threshold, direct communication is allowed between the first user equipment and the second user equipment; and if the receive power is less than the second threshold, direct communication is prohibited between the first user equipment and the second user equipment. When the receive power is equal to the second threshold, direct communication may be allowed between the first user equipment and the second user equipment, or may also be prohibited between the first user equipment and the second user equipment, thereby preventing the user equipments from performing a direct communication process with relatively high power loss.

Optionally, "direct communication is allowed between the first user equipment and the second user equipment" in the embodiment of the present invention, for example, may be that a process of establishing direct communication is performed by the first user equipment and the second user equipment. For example, the process of establishing a direct communication connection shown in FIG. 1 to FIG. 4, includes one or more of the following steps in the processes that the second user equipment sends a discovery message to the first user equipment, the first user equipment sends a paging message to the second user equipment, or the second user equipment sends a paging ACK message to the first user equipment. "Performing direct communication" may also be that the first user equipment and the second user equipment, after establishing the direct communication connection, perform a direct communication service, for example, to perform a voice service or perform a data service. "Allowed" indicates that the first user equipment and the second user equipment may perform direct communication immediately, or may also perform direct communication after some time, which is not limited in the embodiment of the present invention.

Optionally, "direct communication is prohibited between the first user equipment and the second user equipment" in the embodiment of the present invention may be that the process of establishing the direct communication connection is interrupted by the first user equipment and the second user equipment, for example, after receiving a discovery message sent by the second user equipment, the first user equipment does not send a paging message to the second user equipment, or after receiving a paging message sent by the second user equipment, the first user equipment sends a paging NACK message to the second user equipment; or may also be that the first user equipment and the second user equipment stop performing the direct communication service or end the direct communication connection.

Optionally, the fourth message may be a discovery message, a paging message, a paging response message, a service message, or a test message. The service message may be a data service message or a voice service message that the second user equipment sends to the first user equipment when performing a direct communication service with the first user equipment. The test message may be a message that is used to test the receive power of the message and sent by the second user equipment at any time.

Optionally, before the determining whether direct communication is allowed between the first user equipment and the second user equipment, the method further includes receiving a second threshold sent by a network server, where the network server includes an eNodeB, a BTS, an SGW, a PGW, an RNC, or a core network element; or receiving a second threshold sent by a third user equipment, where the third user equipment includes a Cluster head or a Wi-Fi hotspot device. In addition, the second threshold may also be pre-stored in the first user equipment, and using the second threshold pre-stored in the first user equipment, it is determined whether direct communication with the second user equipment is performed. Pre-stored herein indicates that a threshold is written into the first user equipment upon delivery, or a threshold on the first user equipment is set or changed in use. In this embodiment, a second threshold sent by a network server or another user equipment is received to implement control on direct communication between user equipments within a system range, which meets a requirement of a network provider, a telecommunications operator, and a home network owner for controlling a direct communication network.

The embodiment of the present invention further provides a computer program product, including computer program code, and when the computer program code is executed by a computer, the computer performs all steps of the foregoing embodiment.

Figure 9A:
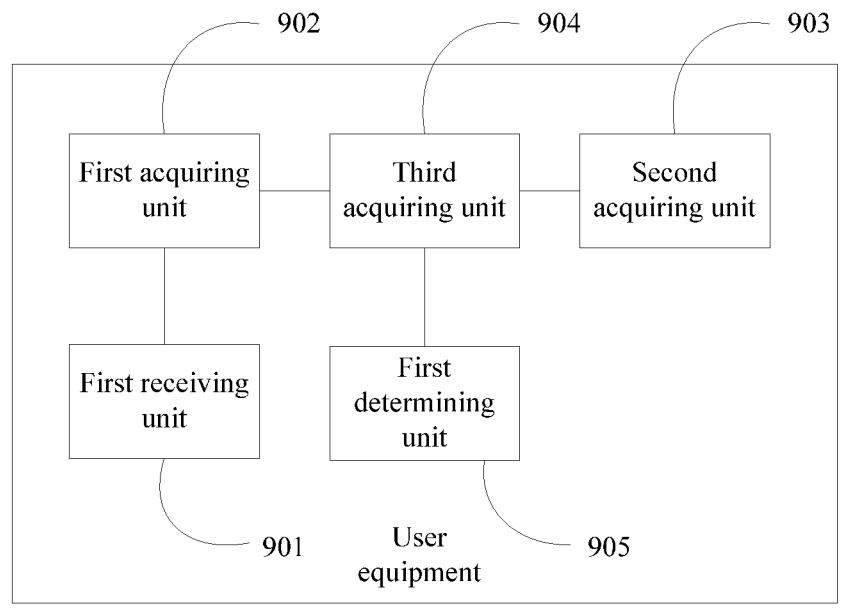
FIG. 9A is a schematic structural diagram of a user equipment disclosed by an embodiment of the present invention.

An embodiment of the present invention further provides a user equipment, as shown in FIG. 9A, including a first receiving unit 901 configured to receive a first message sent by a second user equipment; a first acquiring unit 902 configured to acquire receive power of the first message; a second acquiring unit 903 configured to acquire power parameter information of the second user equipment; a third acquiring unit 904 configured to obtain a path loss value according to the power parameter information of the second user equipment and the receive power of the first message; and a first determining unit 905 configured to determine, according to the path loss value, whether direct communication is allowed between the user equipment and the second user equipment.

According to the foregoing user equipment, a path loss value is obtained using power parameter information of a user equipment sending a message and receive power of the message; and then it is determined, according to the path loss value, whether direct communication between user equipments is allowed. This can implement management and control on direct communication of the user equipments, prevent the user equipments from performing a direct communication service with an unsatisfactory power loss and unnecessary signaling interworking, and reduce electricity loss of the user equipments. In addition, this also prevents a direct communication service with poor communication quality from interfering with another communication service, and optimizes a network environment.

Optionally, the first acquiring unit 902 may obtain the receive power of the first message in a manner of measurement, or another apparatus obtains the receive power of the first message by measurement or in another manner and then the first acquiring unit 902 acquires the receive power of the first message, which is not limited in the present invention.

Optionally, the first determining unit 905 is configured to, if the path loss value is less than a first threshold, allow direct communication between the user equipment and the second user equipment; and if the path loss value is greater than the first threshold, prohibit direct communication between the user equipment and the second user equipment. When the path loss value is equal to the first threshold, direct communication may be allowed between the user equipment and the second user equipment, or may also be prohibited between the user equipment and the second user equipment, thereby preventing the user equipments from performing a direct communication process with relatively high power loss.

Optionally, the first message may be a discovery message, a paging message, a paging response message, a service message, or a test message. The service message may be a data service message or a voice service message that the second user equipment sends to the user equipment when performing a direct communication service with the user equipment. The test message may be a message that is used to test the receive power of the message and sent by the second user equipment at any time.

Figure 9B:
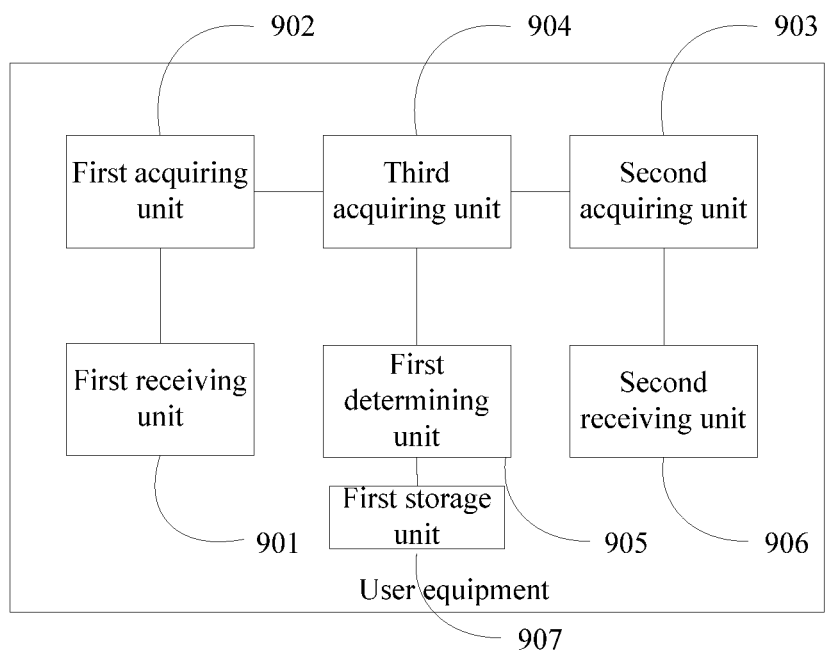
FIG. 9B is a schematic structural diagram of another user equipment disclosed by an embodiment of the present invention.

The second acquiring unit 903 is configured to, if the first message carries the power parameter information of the second user equipment, acquire the power parameter information of the second user equipment carried in the first message; or, as shown in FIG. 9B, the user equipment further includes a second receiving unit 906 configured to receive a second message, where the second message carries the power parameter information of the second user equipment; and the second acquiring unit 903 is configured to acquire the power parameter information of the second user equipment carried in the second message. The second message may be sent by the second user equipment, may be sent by another user equipment, or may also be sent by a network-side server, for example, a base station device, such as an eNodeB, a BTS, an SGW, a PGW, or an RNC, or may be sent by a user equipment management device, such as a user-side Cluster head or a Wi-Fi hotspot device. For example, a server eNodeB broadcasts power parameter information for transmitting a signal by a user equipment within a serving range of the server eNodeB, specifying that all or some of user equipments need to transmit a signal using the power parameter information. Then, the second message may be a broadcast message that the eNodeB sends to specify the power parameter information of the user equipment.

Optionally, the power parameter information of the second user equipment may be a specific transmit power value of the second user equipment, or may also be a transmit power range or a power class of the second user equipment.

If the power parameter information of the second user equipment is a transmit power value of the second user equipment, the third acquiring unit 904 is configured to perform calculation according to the transmit power value of the second user equipment and a receive power value of the first message to obtain the path loss value.

If the power parameter information of the second user equipment is a transmit power range or a power class of the second user equipment, the third acquiring unit 904 is configured to determine a maximum transmit power value of the second user equipment according to the transmit power range or the power class of the second user equipment, and perform calculation according to the maximum transmit power value of the second user equipment and the receive power value of the first message to obtain the path loss value. A path loss value obtained through calculation using the maximum transmit power value is a maximum path loss value theoretically. The path loss value may also be obtained through calculation using the receive power and an intermediate value, a minimum value, or any power value within the power range, which is not limited in the present invention.

It should be noted that the foregoing manner of calculating the path loss value is merely an example, and the path loss value may also be obtained through calculation in another manner or using another formula according to the receive power and the transmit power value, the transmit power range, or the power class. In addition, the path loss value may also be obtained by looking up a table, querying a database, or in another manner requiring no calculation. For example, a plurality of transmit power values or a plurality of power classes, corresponding receive power, and corresponding path loss values are stored in the database, and the path loss value may be obtained by searching for a corresponding transmit power value, power class, and receive power.

The power parameter information in the embodiment may be carried using a bit value of a certain message, or may be indicated in a manner of a time resource, a frequency resource, or a code division resource. The power parameter information is indicated by a time resource, a frequency resource, or a code word resource for transmitting the first message, without the need to occupy a byte of the message, which is simpler and more practical.

Optionally, the user equipment may further include a third receiving unit 905 configured to receive a first threshold sent by a network server, where the network server includes an eNodeB, a BTS, an SGW, a PGW, an RNC, or a core network element; or configured to receive a first threshold sent by a third user equipment, where the third user equipment includes a Cluster head or a Wi-Fi hotspot device.

The user equipment may further include a first storage unit 907 configured to pre-store the first threshold. Pre-stored herein indicates that a threshold is written into the user equipment upon delivery, or a threshold on the user equipment is set or changed in use.

In the embodiment, a first threshold sent by a network server or another user equipment is received to implement control on direct communication between user equipments within a system range, which meets a requirement of a network provider, a telecommunications operator, and a home network owner for controlling a direct communication network.

Figure 10:
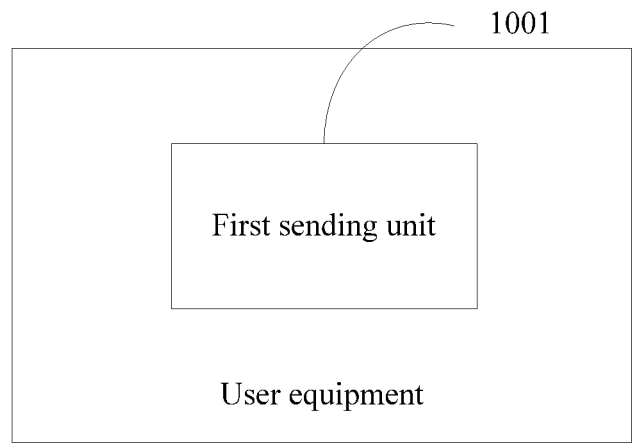
FIG. 10 is a schematic structural diagram of still another user equipment disclosed by an embodiment of the present invention.

As shown in FIG. 10, an embodiment further provides a user equipment, which is configured to implement the function of the second user equipment in the foregoing embodiment and includes a first sending unit 1001 configured to send a first message to a first user equipment, where the first message carries power parameter information of the user equipment, to obtain a path loss value according to receive power of the first message and the power parameter information of the user equipment, and determine, according to the path loss value, whether direct communication is allowed between the first user equipment and the user equipment.

Figure 11:
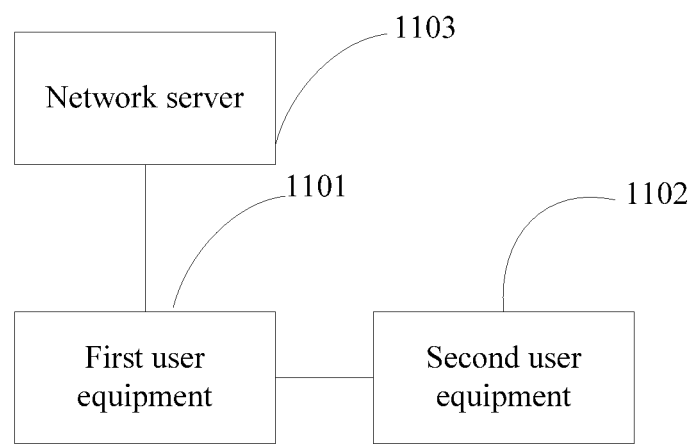
FIG. 11 is a schematic diagram of a system disclosed by an embodiment of the present invention.

As shown in FIG. 11, an embodiment of the present invention further provides a system, including a first user equipment 1101 and a second user equipment 1102, where the first user equipment 1101 is configured to receive a first message sent by the second user equipment 1102, acquire receive power of the first message; acquire power parameter information of the second user equipment 1102; obtain a path loss value according to the power parameter information of the second user equipment 1102 and the receive power of the first message; and determine, according to the path loss value, whether direct communication is allowed between the first user equipment 1101 and the second user equipment 1102.

The second user equipment is configured to send the first message to the first user equipment 1101, where the first message carries the power parameter information of the second user equipment 1102.

Optionally, the system may further include a network server 1103 configured to send a first threshold to the first user equipment 1101, where the network server may be an eNodeB, a BTS, an SGW, a PGW, an RNC, or a core network element.

Figure 12:
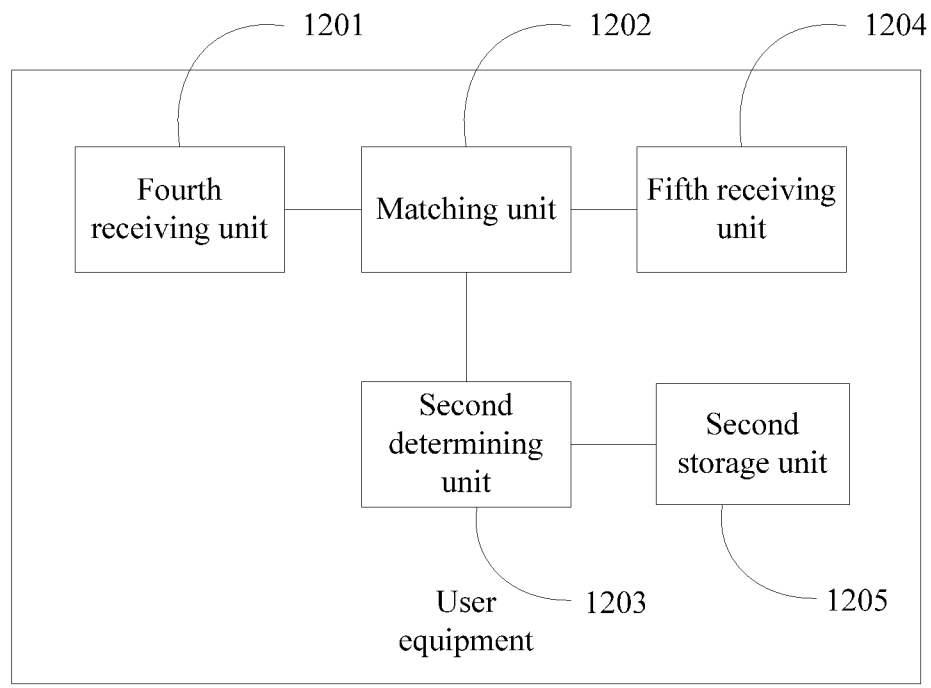
FIG. 12 is a schematic structural diagram of yet another user equipment disclosed by an embodiment of the present invention.

As shown in FIG. 12, an embodiment of the present invention further provides yet another user equipment, including a fourth receiving unit 1201 configured to receive a third message sent by a second user equipment, where the third message carries a power class of the second user equipment; a matching unit 1202 configured to match a rule of direct communication according to a power class of the user equipment and the power class of the second user equipment, where the rule specifies a power class condition under which direct communication can be performed; and a second determining unit 1203 configured to determine, according to a result of the matching, whether direct communication is allowed between the user equipment and the second user equipment.

According to the foregoing user equipment, by matching power parameter classes of user equipments with a rule of establishing direct communication, it is determined whether direct communication is allowed between the user equipments. This can implement management and control on direct communication of the user equipments, prevent the user equipments from performing an unsatisfactory direct communication service and unnecessary signaling interworking, and reduce electricity loss of the user equipments. In addition, this also prevents a direct communication service with poor communication quality from interfering with another communication service, and optimizes a network environment.

"Rule" in the embodiment specifies a power class condition under which direct communication can be performed, and is a standard for determining whether a user equipment of a certain power class and a user equipment of a certain power class can perform direct communication, and may be a table, a function relationship, or the like.

Optionally, the user equipment may further include a fifth receiving unit 1204 configured to receive a rule sent by a network server, where the network server includes an eNodeB, a BTS, an SGW, a PGW, an RNC, or a core network element; or configured to receive a rule sent by a third user equipment, where the third user equipment includes a Cluster head or a Wi-Fi hotspot device.

Optionally, the user equipment may further include a second storage unit 1205 configured to pre-store a rule. The user equipment may determine, according to the pre-stored rule of direct communication, whether to perform direct communication with the second user equipment.

In this embodiment, the rule of direct communication sent by a network server or another user equipment is received to implement control on direct communication between user equipments within a system range, which meets a requirement of a network provider, a telecommunications operator, and a home network owner for controlling a direct communication network.

Optionally, the third message may be a discovery message, a paging message, a paging response message, a service message, or a test message. The service message may be a data service message or a voice service message that the second user equipment sends to the user equipment when performing a direct communication service with the user equipment. The test message may be a message that is used to test the receive power of the message and sent by the second user equipment at any time. A bit value of the third message may be used to indicate the power class, for example, 00 indicates a high class, 01 indicates a medium class, and 10 indicates a low class. In addition, the power class may also be indicated by a time resource, a frequency resource, or a code word resource for transmitting the third message, without the need to occupy a byte of the message, which is simpler and more practical.

Figure 13:
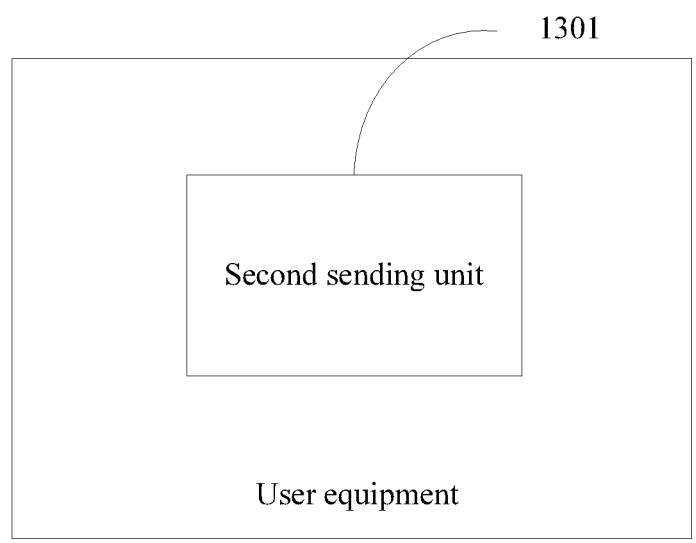
FIG. 13 is a schematic structural diagram of yet another user equipment disclosed by an embodiment of the present invention.

As shown in FIG. 13, an embodiment further provides a user equipment, which is configured to implement the function of the second user equipment in the foregoing embodiment and includes a second sending unit 1301 configured to send a third message to a first user equipment, where the third message carries a power class of the user equipment, to match a rule of direct communication according to a power class of the first user equipment and the power class of the user equipment, and determine, according to a result of the matching, whether direct communication is allowed between the first user equipment and the user equipment.

Figure 14:
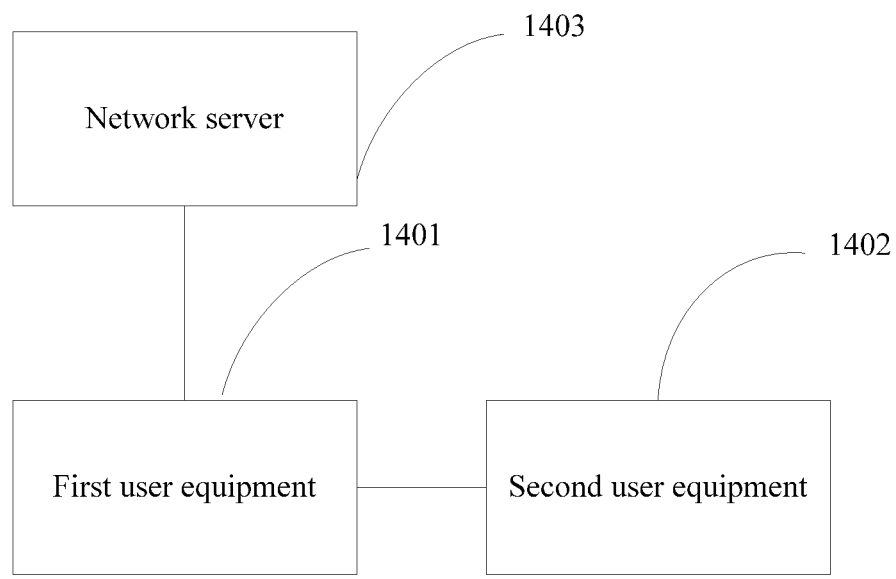
FIG. 14 is a schematic diagram of another system disclosed by an embodiment of the present invention.

As shown in FIG. 14, an embodiment further provides a system, including a first user equipment 1401 and a second user equipment 1402, where the first user equipment 1401 is configured to receive a third message sent by the second user equipment 1402, where the third message carries a power class of the second user equipment 1402; match a rule of direct communication according to a power class of the first user equipment 1401 and the power class of the second user equipment 1402, where the rule specifies a power class condition under which direct communication can be performed; and determine, according to a result of the matching, whether direct communication is allowed between the first user equipment 1401 and the second user equipment 1402.

The second user equipment 1402 is configured to send the third message to the first user equipment 1401, where the third message carries the power class of the user equipment.

Optionally, the system may further include a network server 1403 configured to send a rule to the first user equipment 1401, where the network server may be an eNodeB, a BTS, an SGW, a PGW, an RNC, or a core network element.

Figure 15A:
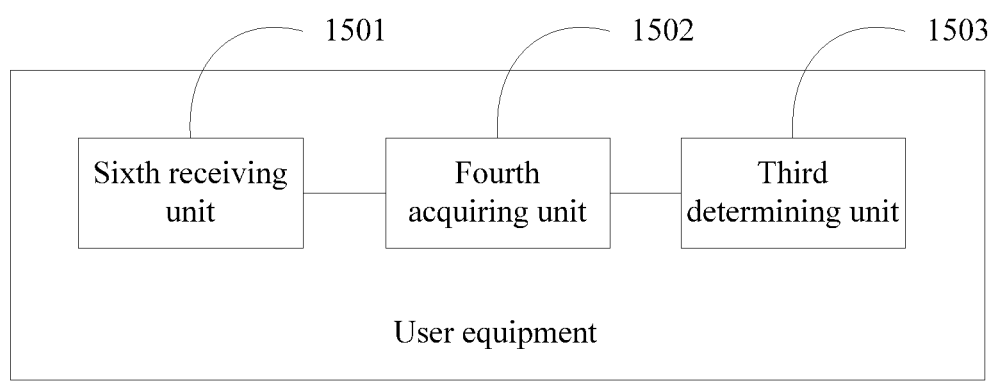
FIG. 15A is a schematic structural diagram of yet another user equipment disclosed by an embodiment of the present invention.

As shown in FIG. 15A, an embodiment provides yet another user equipment, including a sixth receiving unit 1501 configured to receive a fourth message sent by a second user equipment; a fourth acquiring unit 1502 configured to acquire receive power of the fourth message; and a third determining unit 1503 configured to determine, according to the receive power of the fourth message, whether direct communication is allowed between the user equipment and the second user equipment.

According to the foregoing user equipment, using receive power of a message, it is determined whether direct communication is allowed between user equipments. This can implement management and control on direct communication of the user equipments, prevent the user equipments from performing a direct communication service with unsatisfactory message receive power and unnecessary signaling interworking, and reduce electricity loss of the user equipments. In addition, this also prevents a direct communication service with poor communication quality from interfering with another communication service, and optimizes a network environment.

Optionally, the receive power of the fourth message may be obtained in a manner of measurement, may be measured by the fourth acquiring unit 1502, or may also be measured by another apparatus or device, which is not limited in the present invention.

Optionally, the third determining unit may be configured to, if the receive power is greater than a second threshold, allow direct communication between the user equipment and the second user equipment; and if the receive power is less than the second threshold, prohibit direct communication between the user equipment and the second user equipment. When the receive power is equal to the first threshold, direct communication may be allowed between the user equipment and the second user equipment, or may also be prohibited between the user equipment and the second user equipment, thereby preventing the user equipments from performing a direct communication process with relatively high power loss.

Optionally, the fourth message may be a discovery message, a paging message, a paging response message, a service message, or a test message. The service message may be a data service message or a voice service message that the second user equipment sends to the user equipment when performing a direct communication service with the user equipment. The test message may be a message that is used to test the receive power of the message and sent by the second user equipment at any time.

Figure 15B:
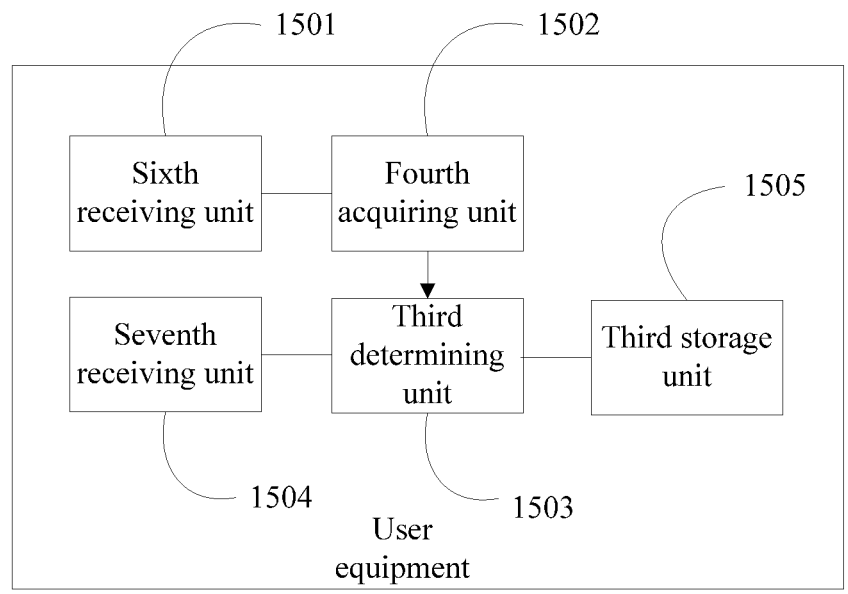
FIG. 15B is a schematic structural diagram of yet another user equipment disclosed by an embodiment of the present invention.

Optionally, as shown in FIG. 15B, the user equipment may further include a seventh receiving unit 1504 configured to receive a second threshold sent by a network server, where the network server includes an eNodeB, a BTS, an SGW, a PGW, an RNC, or a core network element; or configured to receive a second threshold sent by a third user equipment, where the third user equipment includes a Cluster head or a Wi-Fi hotspot device.

Optionally, the user equipment may further include a third storage unit 1505 configured to pre-store the second threshold.

In this embodiment, a second threshold sent by a network server or another user equipment is received to implement control on direct communication between user equipments within a system range, which meets a requirement of a network provider, a telecommunications operator, and a home network owner for controlling a direct communication network.

Figure 16:
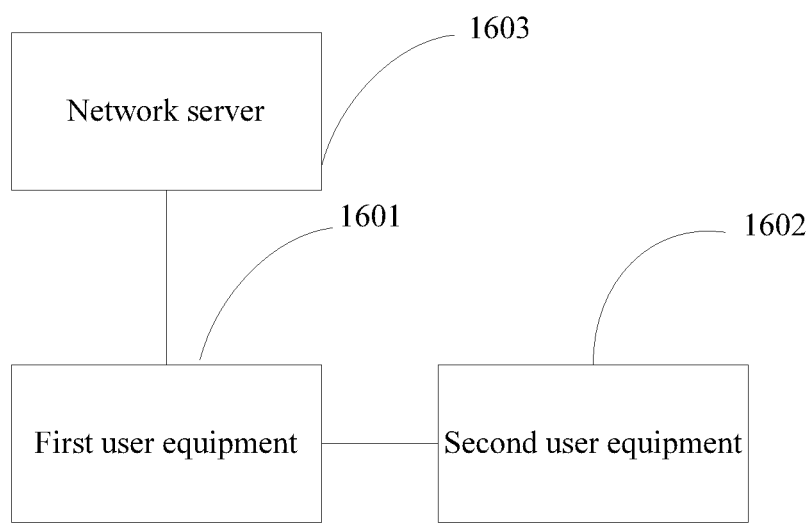
FIG. 16 is a schematic diagram of still another system disclosed by an embodiment of the present invention.

As shown in FIG. 16, an embodiment further provides a system, including a first user equipment 1601 and a second user equipment 1602, where the first user equipment 1601 is configured to receive a fourth message sent by the second user equipment 1602, acquire receive power of the fourth message; and determine, according to the receive power of the fourth message, whether direct communication is allowed between the first user equipment 1601 and the second user equipment 1602. The second user equipment 1602 is configured to send the fourth message to the first user equipment 1601.

Optionally, the system may further include a network server 1603 configured to send a second threshold to the first user equipment 1601, where the network server may be an eNodeB, a BTS, an SGW, a PGW, an RNC, or a core network element.

Figure 17:
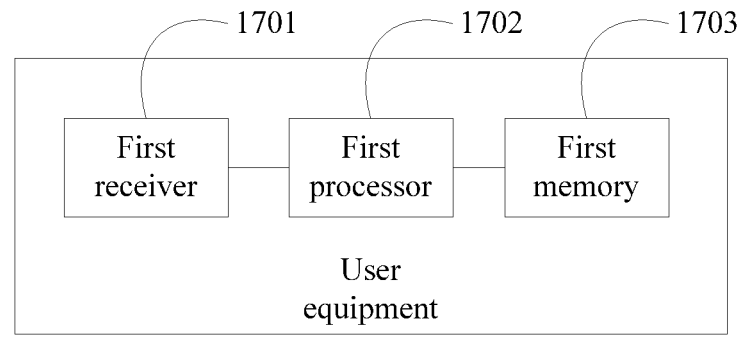
FIG. 17 is a schematic structural diagram of yet another user equipment disclosed by an embodiment of the present invention.

As shown in FIG. 17, an embodiment provides yet another user equipment, including a first receiver 1701 configured to receive a first message sent by a second user equipment; and a first processor 1702 configured to acquire receive power of the first message, further acquire power parameter information of the second user equipment, obtain a path loss value according to the power parameter information of the second user equipment and the receive power of the first message; and determine, according to the path loss value, whether direct communication is allowed between the user equipment and the second user equipment.

According to the foregoing user equipment, a path loss value is obtained using power parameter information of a user equipment sending a message and receive power of the message; and then it is determined, according to the path loss value, whether direct communication between user equipments is allowed. This can implement management and control on direct communication of the user equipments, prevent the user equipments from performing a direct communication service with an unsatisfactory power loss and unnecessary signaling interworking, and reduce electricity loss of the user equipments. In addition, this also prevents a direct communication service with poor communication quality from interfering with another communication service, and optimizes a network environment.

Optionally, the first processor 1702 may obtain the receive power of the first message in a manner of measurement, or another apparatus obtains the receive power of the first message by measurement or in another manner and then the first processor 1702 acquires the receive power of the first message, which is not limited in the present invention.

Optionally, the first processor 1702 is configured to, if the path loss value is less than a first threshold, allow direct communication between the user equipment and the second user equipment; and if the path loss value is greater than the first threshold, prohibit direct communication between the user equipment and the second user equipment. When the path loss value is equal to the first threshold, direct communication may be allowed between the user equipment and the second user equipment, or may also be prohibited between the user equipment and the second user equipment, thereby preventing the user equipments from performing a direct communication process with relatively high power loss.

Optionally, the first message may be a discovery message, a paging message, a paging response message, a service message, or a test message. The service message may be a data service message or a voice service message that the second user equipment sends to the user equipment when performing a direct communication service with the user equipment. The test message may be a message that is used to test the receive power of the message and sent by the second user equipment at any time.

The first processor 1702 is configured to, if the first message carries the power parameter information of the second user equipment, acquire the power parameter information of the second user equipment carried in the first message; or, the first receiver 1701 is further configured to receive a second message, where the second message carries the power parameter information of the second user equipment; and the first processor 1702 is configured to acquire the power parameter information of the second user equipment carried in the second message. The second message may be sent by the second user equipment, may be sent by another user equipment, or may also be sent by a network-side server, for example, a base station device, such as an eNodeB, a BTS, an SGW, a PGW, or an RNC, or may be sent by a user equipment management device, such as a user-side Cluster head or a Wi-Fi hotspot device. For example, a server eNodeB broadcasts power parameter information for transmitting a signal by a user equipment within a serving range of the server eNodeB, specifying that all or some of user equipments need to transmit a signal using the power parameter information. Then, the second message may be a broadcast message that the eNodeB sends to specify the power parameter information of the user equipment.

Optionally, the power parameter information of the second user equipment may be a specific transmit power value of the second user equipment, or may also be a transmit power range or a power class of the second user equipment.

If the power parameter information of the second user equipment is a transmit power value of the second user equipment, the first processor 1702 is configured to perform calculation according to the transmit power value of the second user equipment and a receive power value of the first message to obtain the path loss value.

If the power parameter information of the second user equipment is a transmit power range or a power class of the second user equipment, the first processor 1702 is configured to determine a maximum transmit power value of the second user equipment according to the transmit power range or the power class of the second user equipment, and perform calculation according to the maximum transmit power value of the second user equipment and a receive power value of the first message to obtain the path loss value. A path loss value obtained through calculation using the maximum transmit power value is a maximum path loss value theoretically. The path loss value may also be obtained through calculation using the receive power and an intermediate value, a minimum value, or any power value within the power range, which is not limited in the present invention.

It should be noted that the foregoing manner of calculating the path loss value is merely an example, and the path loss value may also be obtained through calculation in another manner or using another formula according to the receive power and the transmit power value, the transmit power range, or the power class. In addition, the path loss value may also be obtained by looking up a table, querying a database, or in another manner requiring no calculation. For example, a plurality of transmit power values or a plurality of power classes, corresponding receive power, and corresponding path loss values are stored in the database, and the path loss value may be obtained by searching for a corresponding transmit power value, power class, and receive power.

The power parameter information in the embodiment may be carried using a bit value of a certain message, or may be indicated in a manner of a time resource, a frequency resource, or a code division resource. The power parameter information is indicated by a time resource, a frequency resource, or a code word resource for transmitting the first message, without the need to occupy a byte of the message, which is simpler and more practical.

Optionally, the first receiver 1701 is further configured to receive a first threshold sent by a network server, where the network server includes an eNodeB, a BTS, an SGW, a PGW, an RNC, or a core network element; or configured to receive a first threshold sent by a third user equipment, where the third user equipment includes a Cluster head or a Wi-Fi hotspot device.

As shown in FIG. 17, the user equipment may further include a first memory 1703 configured to pre-store the first threshold. Pre-stored herein indicates that a threshold is written into the user equipment upon delivery, or a threshold on the user equipment is set or changed in use.

In the embodiment, a first threshold sent by a network server or another user equipment is received to implement control on direct communication between user equipments within a system range, which meets a requirement of a network provider, a telecommunications operator, and a home network owner for controlling a direct communication network.

Figure 18:
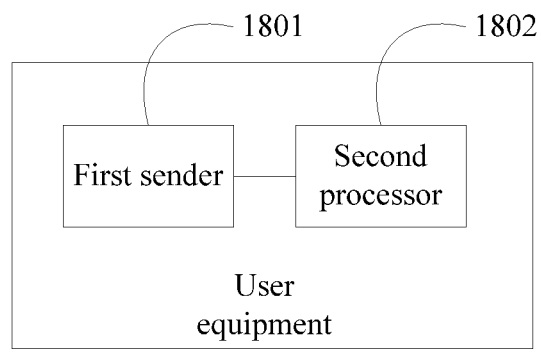
FIG. 18 is a schematic structural diagram of yet another user equipment disclosed by an embodiment of the present invention.

As shown in FIG. 18, an embodiment further provides a user equipment, which is configured to implement the function of the second user equipment in the foregoing embodiment and includes a first sender 1801 configured to send a first message to a first user equipment, where the first message carries power parameter information of the user equipment, to obtain a path loss value according to receive power of the first message and the power parameter information of the user equipment, and determine, according to the path loss value, whether direct communication is allowed between the first user equipment and the user equipment; and a second processor 1802 configured to generate the first message.

An embodiment of the present invention further provides a system, including the first user equipment and the second user equipment described above.

Figure 19:
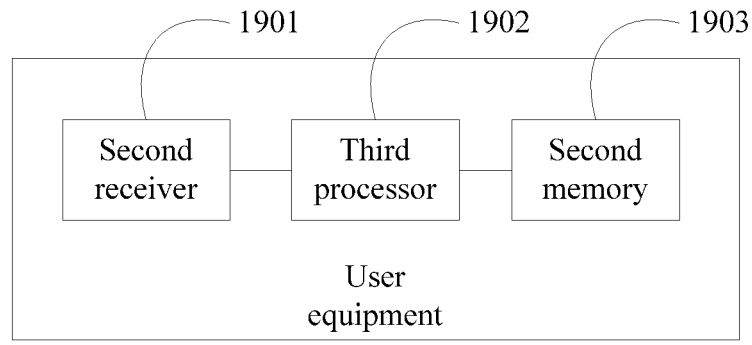
FIG. 19 is a schematic structural diagram of yet another user equipment disclosed by an embodiment of the present invention.

As shown in FIG. 19, an embodiment of the present invention further provides yet another user equipment, including a second receiver 1901 configured to receive a third message sent by a second user equipment, where the third message carries a power class of the second user equipment; and a third processor 1902 configured to match a rule of direct communication according to a power class of the user equipment and the power class of the second user equipment, where the rule specifies a power class condition under which direct communication can be performed; and determine, according to a result of the matching, whether direct communication is allowed between the user equipment and the second user equipment.

According to the foregoing user equipment, by matching power parameter classes of user equipments with a rule of establishing direct communication, it is determined whether direct communication is allowed between the user equipments. This can implement management and control on direct communication of the user equipments, prevent the user equipments from performing an unsatisfactory direct communication service and unnecessary signaling interworking, and reduce electricity loss of the user equipments. In addition, this also prevents a direct communication service with poor communication quality from interfering with another communication service, and optimizes a network environment.

"Rule" in the embodiment specifies a power class condition under which direct communication can be performed, and is a standard for determining whether a user equipment of a certain power class and a user equipment of a certain power class can perform direct communication, and may be a table, a function relationship, or the like.

Optionally, the second receiver 1901 is further configured to receive a rule sent by a network server, where the network server includes an eNodeB, a BTS, an SGW, a PGW, an RNC, or a core network element; or configured to receive a rule sent by a third user equipment, where the third user equipment includes a Cluster head or a Wi-Fi hotspot device.

Optionally, the user equipment may further include a second memory 1903 configured to pre-store a rule. The user equipment may determine, according to the pre-stored rule of direct communication, whether to perform direct communication with the second user equipment.

In this embodiment, the rule of direct communication sent by a network server or another user equipment is received to implement control on direct communication between user equipments within a system range, which meets a requirement of a network provider, a telecommunications operator, and a home network owner for controlling a direct communication network.

Optionally, the third message may be a discovery message, a paging message, a paging response message, a service message, or a test message. The service message may be a data service message or a voice service message that the second user equipment sends to the user equipment when performing a direct communication service with the user equipment. The test message may be a message that is used to test the receive power of the message and sent by the second user equipment at any time. A bit value of the third message may be used to indicate the power class, for example, 00 indicates a high class, 01 indicates a medium class, and 10 indicates a low class. In addition, the power class may also be indicated by a time resource, a frequency resource, or a code word resource for transmitting the third message, without the need to occupy a byte of the message, which is simpler and more practical.

Figure 20:
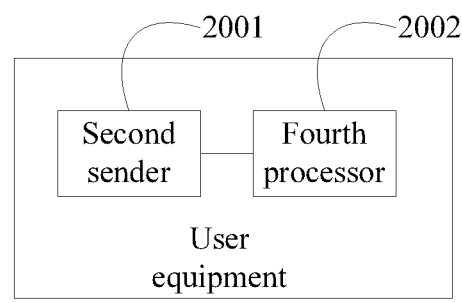
FIG. 20 is a schematic structural diagram of yet another user equipment disclosed by an embodiment of the present invention.

As shown in FIG. 20, an embodiment further provides a user equipment, which is configured to implement the function of the second user equipment in the foregoing embodiment and includes a second sender 2001 configured to send a third message to a first user equipment, where the third message carries a power class of the user equipment, to match a rule of direct communication according to a power class of the first user equipment and the power class of the user equipment, and determine, according to a result of the matching, whether direct communication is allowed between the first user equipment and the user equipment; and a fourth processor 2002 configured to generate the third message.

An embodiment further provides a system including the first user equipment and the second user equipment described above.

Figure 21:
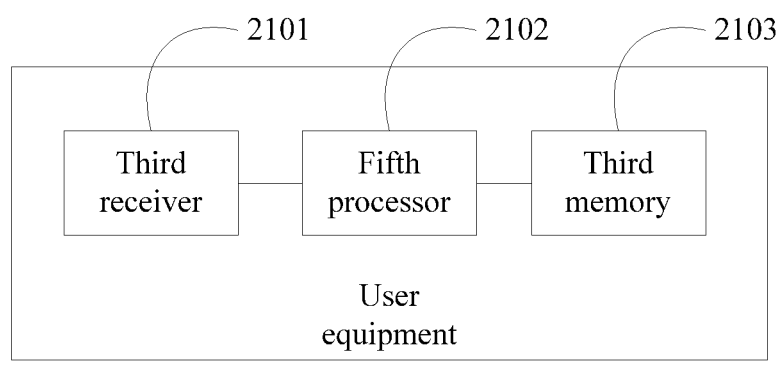
FIG. 21 is a schematic structural diagram of yet another user equipment disclosed by an embodiment of the present invention.

As shown in FIG. 21, an embodiment provides yet another user equipment, including a third receiver 2101 configured to receive a fourth message sent by a second user equipment; and a fifth processor 2102 configured to acquire receive power of the fourth message; and determine, according to the receive power of the fourth message, whether direct communication is allowed between the user equipment and the second user equipment.

According to the foregoing user equipment, using receive power of a message, it is determined whether direct communication is allowed between user equipments. This can implement management and control on direct communication of the user equipments, prevent the user equipments from performing a direct communication service with unsatisfactory message receive power and unnecessary signaling interworking, and reduce electricity loss of the user equipments. In addition, this also prevents a direct communication service with poor communication quality from interfering with another communication service, and optimizes a network environment.

Optionally, the receive power of the fourth message may be obtained in a manner of measurement, may be measured by the fifth processor 2102, or may also be measured by another apparatus or device, which is not limited in the present invention.

Optionally, the fifth processor 2102 may be configured to, if the receive power is greater than a second threshold, allow direct communication between the user equipment and the second user equipment; and if the receive power is less than the second threshold, prohibit direct communication between the user equipment and the second user equipment. When the receive power is equal to the second threshold, direct communication may be allowed between the first user equipment and the second user equipment, or may also be prohibited between the first user equipment and the second user equipment, thereby preventing the user equipments from performing a direct communication process with relatively high power loss.

Optionally, the fourth message may be a discovery message, a paging message, a paging response message, a service message, or a test message. The service message may be a data service message or a voice service message that the second user equipment sends to the first user equipment when performing a direct communication service with the first user equipment. The test message may be a message that is used to test the receive power of the message and sent by the second user equipment at any time.

Optionally, the third receiver 2101 may be configured to receive a second threshold sent by a network server, where the network server includes an eNodeB, a BTS, an SGW, a PGW, an RNC, or a core network element; or configured to receive a second threshold sent by a third user equipment, where the third user equipment includes a Cluster head or a Wi-Fi hotspot device.

Optionally, the user equipment may further include a third memory 2103 configured to pre-store the second threshold.

In this embodiment, a second threshold sent by a network server or another user equipment is received to implement control on direct communication between user equipments within a system range, which meets a requirement of a network provider, a telecommunications operator, and a home network owner for controlling a direct communication network.

An embodiment further provides the first user equipment and the second user equipment described above.

It should be noted that the receiver, a sender, the processor, and so on in the embodiments of the present invention may be implemented by an independent hardware module, may also be one integrated microprocessor, or may also be a functional module integrated in a master chip. The memory in the embodiments of the present invention may be a dedicated memory, may also be a part of storage space in one large-capacity memory, or may also be an external memory connected to the processor, for example, a security digital (SD) card. The modules or entities in the device may be distributed on the user equipment in the embodiments according to the description of the embodiments, or may also be correspondingly modified and located in one or more devices different from the embodiments. The modules or entities in the foregoing embodiments may be combined into one module or entity, or split into a plurality of sub-modules or entities.

In the foregoing embodiments, the description of each of the embodiments has respective focuses. For a part that is not described in detail in a certain embodiment, reference may be made to related descriptions in other embodiments. For content not described in detail in the embodiments of the user equipment and the system, reference may be made to the description in the method embodiment.

Persons skilled in the art may understand that the accompanying drawings are merely schematic diagrams of an exemplary embodiment, and modules, entities or processes in the accompanying drawings are not necessarily required for implementing the present invention.

Based on the foregoing descriptions of the implementation manners, persons skilled in the art may clearly understand that the present invention may be implemented by software in addition to a necessary universal hardware platform or by hardware only. In most circumstances, the former is a preferred implementation manner. Based on such an understanding, the technical solutions of the present invention essentially or the part contributing to the prior art may be implemented in a form of a software product. The computer software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A communication control method comprising:
receiving, by a first user equipment, a first message sent by a second user equipment;
acquiring a receive power of the first message;
acquiring power parameter information of the second user equipment, wherein the power parameter information of the second user equipment is at least one of a transmit power range or a power class of the second user equipment;
obtaining a path loss value by performing a calculation according a maximum transmit power value of the second user equipment and the receive power of the first message, wherein the maximum transmit power value is based on the power parameter information; and
determining, according to the path loss value, whether direct communication is allowed between the first user equipment and the second user equipment.

2. The method according to claim 1, wherein the first message comprises the power parameter information of the second user equipment, and wherein acquiring the power parameter information of the second user equipment comprises acquiring the power parameter information of the second user equipment included in the first message.

3. The method according to claim 1, wherein acquiring the power parameter information of the second user equipment comprises:
receiving a second message comprising the power parameter information of the second user equipment; and
acquiring the power parameter information of the second user equipment from the second message.

4. The method according to claim 1, wherein determining, according to the path loss value, whether direct communication is allowed between the first user equipment and the second user equipment comprises:
allowing direct communication between the first user equipment and the second user equipment when the path loss value is less than a first threshold; and
prohibiting direct communication between the first user equipment and the second user equipment when the path loss value is greater than the first threshold.

5. The method according to claim 1, wherein the power parameter information of the second user equipment further comprises a transmit power value of the second user equipment and wherein obtaining the path loss value according to the power parameter information of the second user equipment and the receive power of the first message comprises performing calculation according to the transmit power value of the second user equipment and the receive power value of the first message to obtain the path loss value.

6. The method according to claim 1, wherein the first threshold is pre-stored in the first user equipment.

7. The method according to claim 1, wherein before determining, according to the path loss value, whether direct communication is allowed between the first user equipment and the second user equipment, the method further comprises receiving a first threshold sent by a network server, and wherein the network server comprises at least one of an evolved NodeB (eNodeB), a base transceiver station (BTS), a serving gateway (SGW), a packet gateway (PGW), a radio network controller (RNC), or a core network element.

8. The method according to claim 1, wherein before determining, according to the path loss value, whether direct communication is allowed between the first user equipment and the second user equipment, the method further comprises receiving a first threshold sent by a third user equipment, and wherein the third user equipment comprises at least one of a cluster head or a Wireless Fidelity (Wi-Fi) hotspot device.

9. The method according to claim 1, wherein the first message comprises a discovery message, a paging message, a paging response message, a service message, and a test message.

10. The method according to claim 1, wherein the power parameter information is indicated by at least one of a time resource, a frequency resource, or a code word resource for transmitting the first message.

11. A communication control method, comprising:
sending, by a second user equipment, a first message to a first user equipment,
wherein the first message comprises power parameter information of the second user equipment,
wherein the power parameter information of the second user equipment is at least one of a transmit power range or a power class of the second user equipment,
wherein the power parameter information is used to obtain a path loss by performing a calculation according a maximum transmit power value of the second user equipment and the receive power of the first message,
wherein the maximum transmit power value is based on the power parameter information, and
wherein the power parameter information is used to determine, according to the path loss value, whether direct communication is allowed between the first user equipment and the second user equipment.

12. The method according to claim 11, wherein the first message comprises at least one of a discovery message, a paging message, a paging response message, a service message, or a test message.

13. A user equipment, wherein the user equipment performs communication with a second user equipment, the user equipment comprising:
a receiver configured to receive a first message sent by the second user equipment; and
a processor coupled to the receiver and configured to:
acquire a receive power of the first message;
acquire power parameter information of the second user equipment, wherein the power parameter information of the second user equipment is at least one of a transmit power range or a power class of the second user equipment;
obtain a path loss value by performing a calculation according a maximum transmit power value of the second user equipment and the receive power of the first message, wherein the maximum transmit power value is based on the power parameter information; and
determine, according to the path loss value, whether direct communication is allowed between the first user equipment and the second user equipment.

14. The user equipment according to claim 13, wherein the first message comprises the power parameter information of the second user equipment, and wherein the processor is further configured to acquire the power parameter information of the second user equipment included in the first message.

15. The user equipment according to claim 13, wherein the receiver is further configured to receive a second message comprising the power parameter information of the second user equipment, and wherein the processor is further configured to acquire the power parameter information of the second user equipment from the second message.

16. The user equipment according to claim 13, wherein the processor is further configured to:
allow direct communication between the user equipment and the second user equipment when the path loss value is less than a first threshold; and
prohibit direct communication between the user equipment and the second user equipment when the path loss value is greater than the first threshold.

17. The user equipment according to claim 13, wherein the power parameter information of the second user equipment further comprises a transmit power value of the second user equipment, and wherein the processor is further configured to perform calculation according to the transmit power value of the second user equipment and the receive power value of the first message to obtain the path loss value.

18. The user equipment according to claim 13, wherein the power parameter information is indicated by a time resource, a frequency resource, and a code word resource for transmitting the first message.

* * * * *